US011055778B2

(12) United States Patent
Gallacher

(10) Patent No.: US 11,055,778 B2
(45) Date of Patent: *Jul. 6, 2021

(54) BASKET CREATION SYSTEM AND METHOD

(71) Applicant: Nextshares Solutions, LLC, Boston, MA (US)

(72) Inventor: Desmond John Gallacher, Hingham, MA (US)

(73) Assignee: NextShares Solutions, Inc., Boston, MA (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/433,605

(22) Filed: Jun. 6, 2019

(65) Prior Publication Data

US 2019/0333151 A1   Oct. 31, 2019

Related U.S. Application Data

(63) Continuation of application No. 15/442,236, filed on Feb. 24, 2017, now Pat. No. 10,360,630.

(Continued)

(51) Int. Cl.
*G06Q 40/00* (2012.01)
*G06Q 40/04* (2012.01)
*G06Q 40/06* (2012.01)

(52) U.S. Cl.
CPC .......... *G06Q 40/04* (2013.01); *G06Q 40/06* (2013.01); *G06Q 2220/00* (2013.01)

(58) Field of Classification Search
None
See application file for complete search history.

(56) References Cited

U.S. PATENT DOCUMENTS

2006/0184438 A1* 8/2006 McDow ............. G06Q 40/00
705/35
2007/0078738 A1* 4/2007 Levin ............... G06Q 40/00
705/36 R (Continued)

OTHER PUBLICATIONS

US ETF Model Portfolios, Deutsche Bank Market Reseach; "House View Portfolio—End of Year positioning". Nov. 22, 2016; 19 pages.*

*Primary Examiner* — Olabode Akintola
(74) *Attorney, Agent, or Firm* — Davis, Malm & D'Agostine, P.C.; Richard L. Sampson

(57) ABSTRACT

An apparatus and method is provided for modeling and generating basket data for non-transparent exchange-traded funds (ETFs) for share creation and redemption. Portfolio data, including start of day positions for the ETF and trading information for trades executed by a fund management computer (FMC) during the trading day, is transmitted from the FMC to a basket modeling application computer (BMA). The BMA receives, stores and electronically time-stamps the portfolio data in the native FMC format, and captures, decrypts, stores, and time-stamps encrypted T-1 basket data and creation order data from a primary market trading computer (PMTC) in native PMTC format, this data including creation orders executed by the PMTC during the trading day. The BMA technically validates and transforms the data to form a composite image of the ETF portfolio, applies a set of rules to generate today's basket data (T basket), and disseminates the T basket.

28 Claims, 22 Drawing Sheets

Related U.S. Application Data

(60) Provisional application No. 62/346,155, filed on Jun. 6, 2016, provisional application No. 62/299,909, filed on Feb. 25, 2016.

(56) References Cited

U.S. PATENT DOCUMENTS

| | | | |
|---|---|---|---|
| 2014/0317021 A1* | 10/2014 | Weber | G06Q 40/06 705/36 R |
| 2014/0344186 A1* | 11/2014 | Nadler | G06Q 40/06 705/36 R |
| 2015/0348193 A1* | 12/2015 | Weber | G06Q 40/04 705/37 |
| 2015/0348195 A1* | 12/2015 | Weber | G06Q 10/067 705/36 R |

* cited by examiner

BMA RULES ENGINE EXAMPLE — 530

| SECURITY NAME | SECURITY TYPE | SECTOR | COUNTRY | WEIGHT |
|---|---|---|---|---|
| APPLE INC | COMMON STOCK | CONSUMER DISCRETIONARY | US | 36% |
| GENERAL ELECTRIC CO | COMMON STOCK | CONSUMER DISCRETIONARY | US | 29% |
| AFLAC INC | COMMON STOCK | FINANCIALS | US | 0% |
| REYNOLDS AMERICAN INC | COMMON STOCK | CONSUMER STAPLES | US | 21% |
| CUBESMART | REAL ESTATE INVESTMENT TRUST | INFORMATION TECHNOLOGY | US | 0% |
| JP MORGAN CHASE & CO | COMMON STOCK | FINANCIALS | US | 14% |
| CASH | CASH | CASH | US | 0% |
| | | | | 100% |

EXAMPLE RULES TO RUN:
- ✓ ALLOCATE REITS TO CASH
- ✓ ALLOCATE FINANCIALS TO CASH
- ✓ HIDE OPEN ORDER ACTIVITY
- ✓ ALLOCATE CASH TO REMAINING SECURITIES

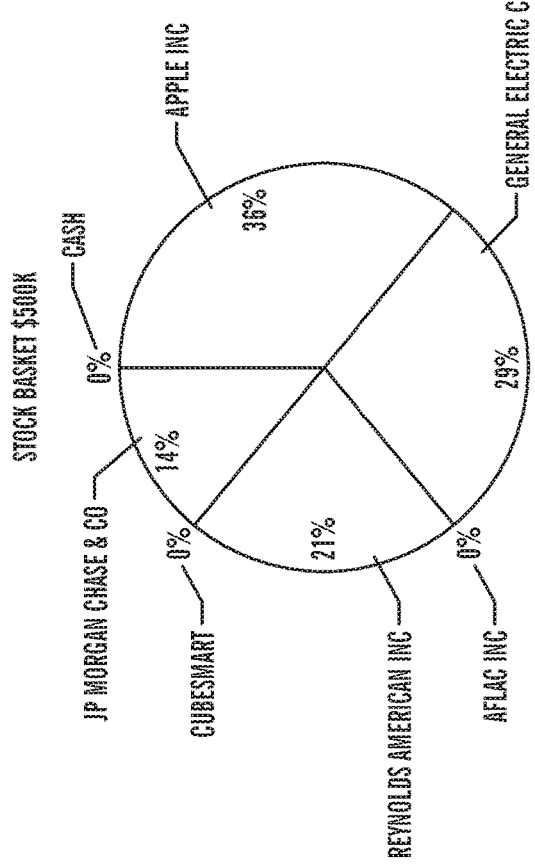

STOCK BASKET $500K

| EATON VANCE STOCK NEXTSHARES [FP4V] ▼ | | BOTTOMS UP ▼ | | | | RULES | POSITIONS | APLF | COMPLIANCE | FEES | MANUAL |

POSITIONS AS-OF 4/15/2016    FILTER BY... ▼    FOR... ▼

[REFRESH RULES] [RUN RULES] [APPROVE RULES]

562

RULE STATUS

| ᵖ DESCRIPTION | ᵖ FUND RULE SEQ ▲ | START DATE | END | PINNED | SEC ID |
|---|---|---|---|---|---|
| AUTOMATIC RULES | 0 | | | 0 | |
| REALLOCATE RE... | 19 | 2016-02-19 | | 1 | |
| REALLOCATE CO... | 20 | 2016-02-19 | | 1 | |
| CURRENT RULES | 0 | | | 0 | |
| REALLOCATE OT... | 3 | 2016-04-13 | | 0 | |
| REALLOCATE NO... | 21 | 2016-02-19 | | 1 | |
| UNION PACIFIC... | 1556 | 2016-04-13 | | 0 | 8000041 |
| ALLERGAN PLC... | 1557 | 2016-04-13 | | 0 | 8000048 |
| PNC FINANCIAL... | 1558 | 2016-04-13 | | 0 | 8000067 |
| PPG INDUSTRIES... | 1559 | 2016-04-13 | | 0 | 8000068 |
| ZIMMER BIOMET... | 1560 | 2016-04-13 | | 0 | 8000085 |
| METLIFE INC [M... | 1561 | 2016-04-13 | | 0 | 8000105 |
| MICROSOFT COR... | 1562 | 2016-04-13 | | 0 | 8000114 |
| SCHLUMBERGER... | 1563 | 2016-04-13 | | 0 | 8000132 |
| TEVA PHARMACE... | 1564 | 2016-04-13 | | 0 | 8000140 |
| SEMPRA ENERGY... | 1565 | 2016-04-13 | | 0 | 8000146 |
| CELGENE CORP... | 1566 | 2016-04-13 | | 0 | 8000156 |

564

| SECURITY NAME ▲ | ACT. WE... | CUST. W..▼ | ACT. QTY | CUST. QTY | ALLOC... |
|---|---|---|---|---|---|
| US DOLLARS | | 1.11 | 0 | | CASH |
| EV CASH RESERVES | 2.79 | | 13,998,214 | | CASH |
| APPLE INC | 3.38 | 3.05 | 151,310 | | CASH |
| GENERAL ELECT... | 3.19 | 3.02 | 515,509 | | CASH |
| JOHNSON & JOHN... | 3.08 | 3.00 | 140,744 | | CASH |
| MICROSOFT COR... | 2.94 | 2.95 | 266,258 | | CASH |
| VERIZON COMM... | 2.56 | 2.72 | 249,510 | | CASH |
| WALT DISNEY CO | 2.50 | 2.63 | 127,233 | | CASH |
| ALPHABET INC-C... | 2.50 | 2.56 | 16,626 | | CASH |
| ORACLE CORP | 2.32 | 2.39 | 281,664 | | CASH |
| UNITED TECHNOL... | 2.40 | 2.32 | 115,107 | | CASH |
| GILEAD SCIENCE... | 2.54 | 2.29 | 129,638 | | CASH |
| CHUBB LTD | 2.17 | 2.20 | 90,427 | | CASH |
| UNION PACIFIC... | 2.00 | 2.13 | 121,643 | | CASH |
| GOODYEAR TIRE... | 1.88 | 2.00 | 295,349 | | CASH |
| PINNACLE FOOD... | 1.88 | 2.00 | 214,557 | | CASH |
| TEVA PHARMACE... | 1.76 | 2.00 | 158,543 | | CASH |
| XL GROUP PLC | 1.89 | 2.00 | 260,577 | | CASH |
| ZIMMER BIOMET... | 1.94 | 2.00 | 84,229 | | CASH |
| PEPSICO INC | 2.26 | 1.97 | 109,711 | | CASH |
| OCCIDENTAL PET... | 1.81 | 1.80 | 122,052 | | CASH |
| FEDERAL REALTY... | 1.56 | 1.75 | 50,557 | | CASH |
| INVESCO LTD | 1.60 | 1.75 | 255,496 | | CASH |
| TIME WARNER INC | 1.71 | 1.75 | 114,000 | | CASH |
| REYNOLDS AMER... | 1.51 | 1.72 | 155,461 | | CASH |
| AMAZON.COM IN... | 1.61 | 1.71 | 12,992 | | CASH |

RULE SECURITIES

| ᵖ FUND DATE ID | ᵖ FUND ID | ᵖ SECURITY ID | ᵖ RULE ID | CU SIP | SECURITY... |
|---|---|---|---|---|---|
| 2081 | 2001 | 8000048 | 1017 | G017... | ALLERGAN... |

| | | | 03/21/2016 | 15 | | | | | | | | |
|---|---|---|---|---|---|---|---|---|---|---|---|---|
| INITIALIZE | RESET | | | ▼ | CREATE/UPDATE EFFECTS | REQUEST TCA | APPROVE FEE | | | | | |
| 🔍 | 🔍 | | FUND NAME ▲ | EFFECTIVE... ▼ | STATUS | 🔍 | FUND CODE | CU | MARKET IMPACT | COMMISSION | TOTAL EARLY | CREATED AT | CREATED BY |
| 2003 | 2026 | ☐ | EATON VANCE GLOB... | 2016-03-21 | EFFECTS CREATED | 35 | FG7C | 1 | 35.0000 | 0.0000 | 35.0000 | 3/22/2016 2:32... | EVNT\DGALLACHER |
| 2001 | 2025 | ☑ | EATON VANCE STOCK... | 2016-03-21 | WAITING | 34 | FP4V | 1 | 6.5833 | 5.0000 | 11.5833 | 3/21/2016 10:5... | EVNT\JLAHEY |
| 2004 | 2027 | ☐ | EATON VANCE TABS... | 2016-03-21 | EFFECTS CREATED | 36 | FG8A | 1 | 10.0000 | 0.0000 | 10.0000 | 3/21/2016 4:45... | EVNT\JLAHEY |

| Tier 1 Fee Amounts | |
|---|---:|
| market_impact | 35.0000 |
| commission | 0.0000 |
| late_penalty | 0.0000 |
| settlement_cost | 0.0000 |
| status | Effects Created |
| fixed_fee | 150.0000 |
| market_impact_adj | |
| average_trade_size | |

FIG. 12

| MAX PREVIEW ROWS | TIMEOUT (SECONDS) | FILTER (TO APPLY TO THIS PREVIEW ONLY) |
|---|---|---|
| 🔍 10 | 🕐 10 | ☐ BUILD... |

DATA / FIELDS

| NAME | TYPE | NULLS ALLOWED? | SQL TYPE | SQL DEFAULT |
|---|---|---|---|---|
| 🔍 "EFFECTIVE_DATE" | DATE/TIME | FALSE | DATE | |
| 🔍 "ACCOUNT" | TEXT | FALSE | VARCHAR(20) | |
| "SECURITY_ID_TYPE" | TEXT | TRUE | VARCHAR(16) | |
| "CRD_SECURITY_ID" | TEXT | TRUE | VARCHAR(26) | |
| 🔍 "CRD_ID" | TEXT | FALSE | VARCHAR(20) | |
| 🔍 "PACE_ID" | TEXT | FALSE | VARCHAR(20) | |
| "SECURITY_TYPE" | TEXT | TRUE | VARCHAR(13) | |
| "PRICE" | APPROXIMATE NUMBER (DECIMAL) | TRUE | DECIMAL(38,20) | |
| "PRICE_DATE" | DATE/TIME | TRUE | DATE | |
| "QTY_HELD" | APPROXIMATE NUMBER (DECIMAL) | TRUE | DECIMAL(38,20) | |
| "MKTVAL_BASE" | APPROXIMATE NUMBER (DECIMAL) | TRUE | DECIMAL(38,20) | |
| "MKTVAL_LOCAL" | APPROXIMATE NUMBER (DECIMAL) | TRUE | DECIMAL(38,20) | |
| "ACC_INC_BASE" | APPROXIMATE NUMBER (DECIMAL) | TRUE | DECIMAL(38,20) | |
| "ACC_INC_LOCAL" | APPROXIMATE NUMBER (DECIMAL) | TRUE | DECIMAL(38,20) | |
| "CADIS_SYSTEM_INSERTED" | DATE/TIME | TRUE | DATE/TIME | GETDATE() |
| "CADIS_SYSTEM_UPDATED" | DATE/TIME | TRUE | DATE/TIME | GETDATE() |
| "CADIS_SYSTEM_CHANGEDBY" | TEXT | TRUE | NVARCHAR(50) | "UNKNOWN" |
| "CADIS_SYSTEM_PRIORITY" | INTEGER (32 BIT) | TRUE | INT | (1) |
| "CADIS_SYSTEM_LASTMODIFIED" | DATE/TIME | TRUE | DATE/TIME | GETDATE() |
| "POSITION_TYPE" | TEXT | TRUE | VARCHAR(5) | "UNKN" |

*FIG. 13B*

DATA TYPE - DEFINE HOW DATA TYPING TESTS SHOULD BE APPLIED TO THE FIELDS

SELECT FIELD: [ ▼ ]

| NAME | TEST | NULL FAILED FIELDS | EXCEPTION CODE | PRIMARY KEY | DATA TYPE | LENGTH |
|---|---|---|---|---|---|---|
| EFFECTIVE_DATE | VALID DATE TIME | ☐ | 2-INVALID DATE | ☑ | DATE | |
| ACCOUNT | VALID LENGTH | ☐ | 6-FIELD LENGTH EXCEEDED | ☑ | VARCHAR | 20 |
| SECURITY_ID_TYPE | VALID LENGTH | ☐ | 6-FIELD LENGTH EXCEEDED | ☐ | VARCHAR | 16 |
| CRD_SECURITY_ID | VALID LENGTH | ☑ ←642 | 6-FIELD LENGTH EXCEEDED | ☐ | VARCHAR | 26 |
| CRD_ID | VALID LENGTH | ☑ | 6-FIELD LENGTH EXCEEDED | ☑ | VARCHAR | 20 |
| PACE_ID | VALID LENGTH | ☐ | 6-FIELD LENGTH EXCEEDED | ☑ | VARCHAR | 20 |
| SECURITY_TYPE | VALID LENGTH | ☐ | 6-FIELD LENGTH EXCEEDED | ☐ | VARCHAR | 13 |
| PRICE | VALID DECIMAL | ☑ | 3-INVALID NUMBER (DECIMAL) | ☐ | DECIMAL | |
| PRICE_DATE | VALID DATE TIME | ☑ | 2-INVALID DATE | ☐ | DATE | |
| QTY_HELD | VALID DECIMAL | ☑ | 3-INVALID NUMBER (DECIMAL) | ☐ | DECIMAL | |
| MKTVAL_BASE | VALID DECIMAL | ☑ | 3-INVALID NUMBER (DECIMAL) | ☐ | DECIMAL | |
| MKTVAL_LOCAL | VALID DECIMAL | ☑ | 3-INVALID NUMBER (DECIMAL) | ☐ | DECIMAL | |
| ACC_INC_BASE | VALID DECIMAL | ☑ | 3-INVALID NUMBER (DECIMAL) | ☐ | DECIMAL | |
| ACC_INC_LOCAL | VALID DECIMAL | ☑ | 3-INVALID NUMBER (DECIMAL) | ☐ | DECIMAL | |
| POSITION_TYPE | VALID LENGTH | ☑ | 6-FIELD LENGTH EXCEEDED | ☐ | VARCHAR | 5 |

FIG. 13C

| | TRANSFORM RULES - THE TRANSFORMATION RULES TO BE APPLIED TO THE SOURCE FIELDS | | | | | | |
|---|---|---|---|---|---|---|---|
| SELECT FIELD: ▼ | ▼ | | | | | | |
| NAME | TRANSFORM | PRIMARY KEY | DATA TYPE | LENGTH | PRECISION | SCALE | OWNER STEP |
| EFFECTIVE_DATE | BMA CONVERT YYYYMMDD TO DATE  *644* | ✓ | DATE | | | | SOURCE FIELDS |
| PRICE | BMA CONVERT SCIENTIFIC TO NORMAL | ☐ | DECIMAL | | 38 | 20 | SOURCE FIELDS |
| QTY_HELD | BMA CONVERT SCIENTIFIC TO NORMAL | ☐ | DECIMAL | | 38 | 20 | SOURCE FIELDS |
| MKTVAL_BASE | BMA CONVERT SCIENTIFIC TO NORMAL | ☐ | DECIMAL | | 38 | 20 | SOURCE FIELDS |
| MKTVAL_LOCAL | BMA CONVERT SCIENTIFIC TO NORMAL | ☐ | DECIMAL | | 38 | 20 | SOURCE FIELDS |
| ACC_INC_BASE | BMA CONVERT SCIENTIFIC TO NORMAL | ☐ | DECIMAL | | 38 | 20 | SOURCE FIELDS |
| ACC_INC_LOCAL | BMA CONVERT SCIENTIFIC TO NORMAL | ☐ | DECIMAL | | 38 | 20 | SOURCE FIELDS |

*FIG. 13D*

| | AUTOMATE PROCESSING ORDER | | | |
|---|---|---|---|---|
| | RULE (PRIORITY 1) | RULE (PRIORITY 2) | RULE (PRIORITY 3) | RULE (PRIO |
| SECALIAS | SECALIAS:({PACE}."SECALIAS") | SECALIAS:({CRD}."PACE_ID") | SECALIAS:({EAGLE}."EXT_SEC_ID") | |
| CRD_ID | CRD_ID:({CRD}."CRDID") | | | |
| EVEREST_ID | EVEREST_ID:({EVEREST}."ASSET_ID") | | | |
| ID_BB_UNIQUE | ID_BB_UNIQUE:({PACE}."UNIQUE_... | ID_BB_UNIQUE:({BRAIN}."... | ID_BB_UNIQUE:({HIT}."UNIQUE_BB... | ID_BB_UNIQUE:({... |
| CAT1 | CAT1:({PACE}."CAT1") | | | |
| FEE_CATEGORY_C... | LOOKUP FEES | | | |
| ISIN | ISIN:({PACE}."ISIN") | ISIN:({CRD}."ISIN") | ISIN:({BRAIN}."ISIN") | ISIN:({HIT}."ISIN") |
| TICKER | TICKER:({PACE}."PRIMARY_TKR") | TICKER:({CRD}."TICKER") | | |
| EXCHANGE | EXCHANGE:({PACE}."EXCHANGE") | | | |
| CUSIP | CUSIP:({PACE}."CUSIP") | CUSIP:({CRD}."CUSIP") | CUSIP:({EVEREST}."CUSIP") | CUSIP:({PERFOR... |
| SEDOL | SEDOL:({PACE}."SEDOL") | SEDOL:({CRD}."SEDOL") | SEDOL:({BRAIN}."SEDOL") | SEDOL:({HIT}."SE... |
| SECURITY_NAME | SECURITY_NAME:({PACE}."ISSUE") | SECURITY_NAME:({CRD}."SECUR... | SECURITY_NAME:({EVEREST}."SEC... | SECURITY_NAME:... |
| PRICE_MULTIPLIER | PRICE_MULTIPLIER:({PACE}."PXFCT... | PRICE_MULTIPLIER:({CRD}."PRI... | | |
| TRADE_UNIT_SIZE | TRADE_UNIT_SIZE:({CRD}."MIN_TR... | DEFAULT1 | | |
| SECTOR | SECTOR:({PACE}."GICS_CLASSIFICA... | SECTOR:({CRD}."SECTOR") | | |
| COUNTRY_CODE | COUNTRY_CODE:({PACE}."CTRY") | COUNTRY_CODE:({CRD}."ISO_C... | COUNTRY_CODE:({TBCASH}."COUNT... | |
| US_MKT_CAP | US_MKT_CAP:({PACE}."US_MKT_C... | US_MKT_CAP:({CRD}."MARKET_... | | |
| SECURITY_TYPE | SECURITY_TYPE:({PACE}."ASSET_CL... | SECURITY_TYPE:({CRD}."SECUR... | SECURITY_TYPE:({EAGLE}."SECURITY... | SECURITY_TYPE:({... |
| INVESTMENT_TYPE | INVESTMENT_TYPE:({PACE}."INVEST... | | | |
| SEC_144A_FLAG | SEC_144A_FLAG:({PACE}."SEC_144... | | | |
| CRNCY | CRNCY:({PACE}."CRNCY") | CRNCY:({CRD}."CURRENCY_COD... | CRNCY:({EVEREST}."CURRENCY") | CRNCY:({EAGLE}... |
| MATURITY | MATURITY:({PACE}."MATURITY") | | | |
| COUPON | COUPON:({PACE}."COUPON") | | | |
| CREATED_BY_CRD | SET CREATED FLAG | DEFAULT 0 | | |
| CREATED_BY_EVE... | SET CREATED FLAG | DEFAULT 0 | | |
| CREATED_BY_PER... | SET CREATED FLAG | SET MUNI CREATED FLAG | SET TABS CREATED FLAG | DEFAULT 0 |
| CREATED_BY_CAP... | SET CREATED FLAG | DEFAULT 0 | | |
| CREATED_BY_BBG | SET CREATED FLAG | SET HIT CREATED FLAG | SET BOND CREATED FLAG | DEFAULT 0 |
| CREATED_BY_EA... | SET CREATED FLAG | DEFAULT 0 | | |
| CREATED_BY | CREATED_BY:({PACE}."PACE EXISTS?") | CREATED_BY:({CRD}."CRD EXIST... | CREATED_BY:({EVEREST}."EVEREST... | CREATED_BY:({PE... |
| NO_IDENTIFIERS | | | | |
| BAD_CUSIP | | | | |

*FIG. 15*

BASKET CREATION SYSTEM AND METHOD

RELATED APPLICATION

This application is a Continuation of U.S. patent application Ser. No. 15/442,236, entitled Basket Creation System and Method, filed on Feb. 24, 2017, which claims the benefit of U.S. Provisional Patent Application Ser. No. 62/299,909, entitled Basket Creation System and Method, filed on Feb. 25, 2016, and claims the benefit of U.S. Provisional Patent Application Ser. No. 62/356,155, entitled Basket Creation System and Method, filed on Jun. 29, 2016, the contents all of which are incorporated herein by reference in their entireties for all purposes.

BACKGROUND

Technical Field

This invention relates to data management systems and more particularly to an automated system for aggregating and transforming data from disparate primary market trading and portfolio management computers to model and produce a daily basket, while maintaining confidentiality of securities selected and held by a non-transparent exchange-traded fund.

Background Information

An OMS (order management system) is a specialized computer system developed to manage and execute securities orders in an efficient and cost-effective manner. These systems execute at volumes, speeds and with levels of security and redundancy that require specialized computer hardware and software. Many versions of OMSs have been developed by various entities for use by particular parties to perform their distinct roles in the securities order and trading process. For example, OMSs are used on both the buy-side (e.g., by a fund) and the sell-side (e.g., brokers and dealers), with differing functionality. Brokers and dealers use OMSs specifically customized for their sell-side use when filling orders for various types of securities and are able to track the progress of each order throughout the system. Primary markets (exchanges) use OMSs that have been specifically customized for their use to manage their operations. Typically only exchange members can connect directly to an exchange, which means that sell-side OMSs may have exchange connectivity, whereas buy-side OMSs are concerned with connecting to sell-side firms.

OMSs allow firms to input orders to the system for routing to pre-established destinations. They also allow firms to change, cancel and update orders. When an order is executed on the sell-side, the sell-side OMS must then update its state and send an execution report to the order's originating firm. OMSs support portfolio management by translating intended asset allocation changes into marketable orders for the buy-side. These asset allocation changes typically involve rebalancing a fund's asset allocation to correct for market valuation changes and cashflows, to align an Index Fund with its target index, and to make discretionary or tactical changes initiated by fund managers.

Because these changes often affect hundreds to hundreds of thousands of accounts creating hundreds of thousands of small orders, and because there is a legitimate fear of front running (i.e., the unethical practice of a stockbroker executing orders on a security for its own account while taking advantage of advance knowledge of pending orders from its customers), orders are typically grouped into aggregate market orders and crossing orders. However, this solution offered by conventional OMSs, fails to solve the front running problem for actively managed, i.e., 'non-transparent', Exchange-traded funds (ETFs).

ETFs are essentially a special type of mutual fund (or, less commonly, unit investment trust (UIT)) whose shares trade on a securities exchange. ETFs shares may be created or redeemed in unit basket amounts by broker-dealer firms serving as "authorized participants" in the ETF. For most ETFs, creation and redemption of units takes place primarily through the delivery of baskets of securities that closely replicate the current unit holdings of the ETF. ETFs that trade publicly in the U.S. are registered under the 1940 Act as mutual funds or UITs, and are subject to the same investment restrictions as non-ETF versions of those vehicles.

In light of these complexities, specialized exchange-traded product (ETP) OMSs have been developed to help manage ETFs. ETP OMSs handle the sophisticated operational flows associated with ETFs, including the way their shares are created and redeemed. As mentioned, rather than cash, institutional investors usually deposit a basket ("creation basket") of stocks "in kind" with the fund in exchange for ETF shares. Typically mirroring the ETF's portfolio, the contents of this creation basket are made available publicly on a daily basis. Likewise, ETF shares can be exchanged for a basket ("redemption basket") of securities and, sometimes, cash.

ETFs must generate these baskets day after day, involving sophisticated risk analytics as well as specialized front-office systems. The accounting side of the operation must also be managed accurately. A net asset value (NAV) for the ETF must not only be calculated at the end of each day, but also a projected NAV for the following day. And as ETF share prices can fluctuate during the day, the ETP OMS must also generate its own intraday version of the NAV. This in turn will determine the contents and hypothetical value of the next day's basket. An example of an ETP OMS is the FlexOMS ETF platform commercially available from Flex-Trade System, Inc. (Great Neck, N.Y.). ETP OMS solutions are also commercially available from Charles River Development (CRD), Burlington, Mass.

ETFs were first introduced in the U.S. market in 1993 and have enjoyed a high rate of growth in assets and trading volume almost since its introduction. The vast majority of ETFs are 'passive', i.e., those based on popular benchmark indexes. Because the indexes are public, the contents of the publically disseminated creation/redemption baskets may closely approximate the holdings of the fund without a substantial risk of disclosing confidential trading activity that may be used for front running.

Today, however, many fund companies wish to offer ETF versions of their actively managed ('non-transparent') mutual funds, i.e., of mutual funds that do not simply follow popular benchmark indexes, but instead, are based on a portfolio of securities selected by active fund managers. Conventional facilities, including OMSs available for the operational management of passive ETFs are in many respects inappropriate for these 'active' or non-transparent ETFs, because daily publication of baskets that closely track the fund's holdings would risk disclosing the fund manager's strategies and promoting front running, etc. Moreover, because of the close alignment of baskets to fund holdings, other aspects of passive ETF management may be managed with less precision than would be desirable for active ETFs.

Therefore, a need exists for a system and method capable of retrofitting and leveraging conventional OMSs and infrastructure to create and manage baskets for active ETFs.

SUMMARY

In one aspect of the present invention, a method is provided for modeling and generating basket data for non-transparent exchange-traded fund (ETF) portfolios for creation and redemption of ETF shares, including securely communicating ETF portfolio data with specialized market trading systems, and electronically validating and transforming the ETF portfolio data and basket data. The method includes communicably coupling a basket modeling application computer (BMA) to: a specialized fund management computer (FMC) that receives start of day positions from a fund database and executes trades throughout a trading day (T) for the ETF; a specialized primary market trading computer (PMTC) that interacts with Authorized Participants (APs) to use yesterday's (T−1) basket data to execute creation orders of the ETF throughout the trading day; a specialized basket dissemination computer (BDC); and a specialized market impact analysis computer (MAC). The method also includes transmitting portfolio data from the FMC to the BMA during the trading day, the portfolio data including start of day positions for the ETF and trading information for trades executed by the FMC during the trading day. The BMA receives, stores and electronically time-stamps the portfolio data in the native FMC format in a raw data file. Also during the trading day, the BMA captures, decrypts, stores in the raw data file, and time-stamps encrypted T−1 basket data and creation order data from the PMTC in its native PMTC format, the T−1 basket data and creation order data including additional portfolio information for the ETF including creation orders executed by the PMTC during the trading day. The BMA then technically validates and transforms the raw data file, separating header information from payload information in data packets stored in the raw data file, and storing the payload information in a stage table to form a composite image of the ETF portfolio. The BMA then applies a set of rules to the composite image of the ETF portfolio to generate today's basket data (T basket). The foregoing is repeated continuously throughout the trading day both before and after the close of trading for the day, followed by the BMA transmitting the T basket to the BDC.

Another aspect of the invention includes an apparatus having a plurality of specialized computers operating as part of a specialized trading network, wherein the computers collectively model and generate basket data for non-transparent exchange-traded fund (ETF) portfolios for creation and redemption of ETF shares, including securely communicating ETF portfolio data with specialized market trading systems, and electronically validating and transforming the ETF portfolio data and basket data. The system includes a specialized fund management computer (FMC) that receives start of day positions from a fund database and executes trades throughout a trading day (T) for the ETF, and a basket modeling application computer (BMA). The BMA is communicably coupled to: the FMC; a specialized primary market trading computer (PMTC) that interacts with Authorized Participants (APs) to use yesterday's (T−1) basket data to execute creation orders of the ETF throughout the trading day; a specialized basket dissemination computer (BDC); and a specialized market impact analysis computer (MAC). The FMC has a memory, a processor, and a stored program in the memory executable by the processor, the stored program configured to cause the FMC to transmit, during the trading day, portfolio data to the BMA, the portfolio data including portfolio information for the ETF including start of day positions and trading information for trades executed by the FMC during the trading day, the portfolio data being disposed in a native FMC format. The BMA has another stored program configured to cause the BMA to receive, store and electronically time-stamp the portfolio data in the native FMC format in a raw data file, to capture, decrypt, store and time-stamp encrypted T−1 basket data and creation order data from the PMTC in its native PMTC format in the raw data file. The other stored program is also configured to cause the BMA to technically validate and transform the raw data file, separating header information from payload information in data packets stored in the raw data file, and storing the payload information in a stage table to form a composite image of the ETF portfolio. The other stored program is also configured to cause the BMA to apply a set of rules to the composite image of the ETF portfolio to generate today's basket data (T basket), to repeat the foregoing continuously throughout the trading day both before and after close of trading for the day, and to transmit the T basket to the BDC.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 6 is a display similar to that of FIG. 5, generated in response to changed input parameters;

FIG. 8 is another display of a graphical user interface generated by embodiments of the present invention;

FIG. 9 is still another display of a graphical user interface generated by embodiments of the present invention;

FIG. 11 is another display of a graphical user interface generated by embodiments of the present invention;

FIG. 12 is another display of a graphical user interface generated by embodiments of the present invention;

FIG. 13B is a screen shot of a graphical user interface generated by embodiments of the present invention;

FIG. 13C is another screen shot of a graphical user interface generated by embodiments of the present invention;

FIG. 13D is yet another screen shot of a graphical user interface generated by embodiments of the present invention;

FIG. 15 is a display of a graphical user interface generated by embodiments of the present invention.

DETAILED DESCRIPTION

Figure 1:
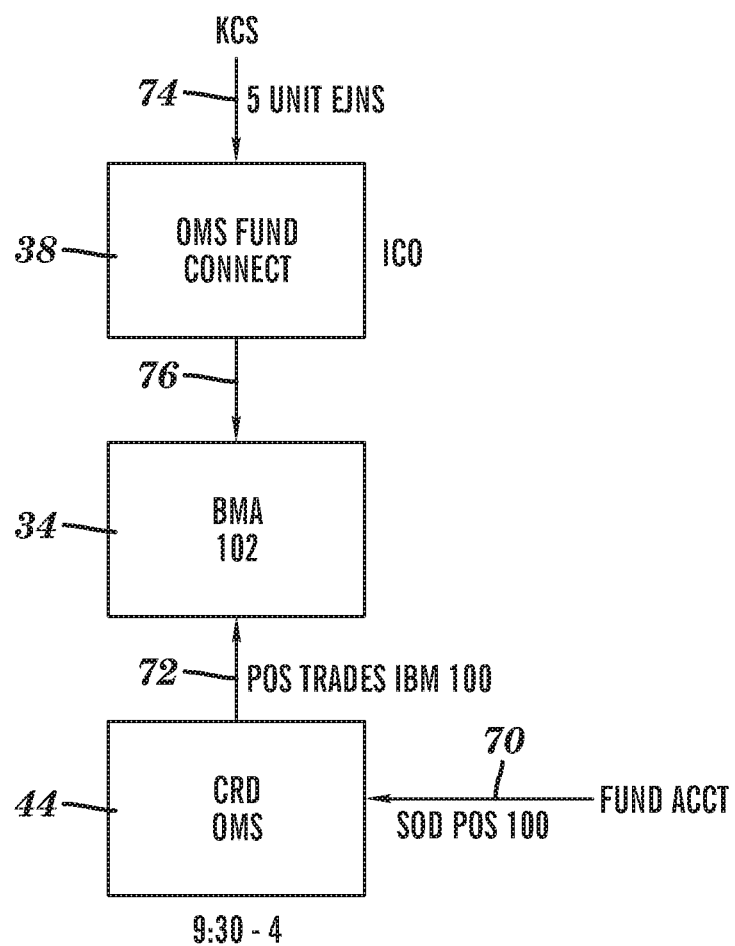
FIG. 1 is a high-level functional block diagram illustrating an embodiment of the present invention in a representative environment.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine", "component", "module", "control components/devices", "messenger component or service," and the like are intended to refer to a computer-related entity, including hardware or a combination of hardware and software. For example, an engine may be, but is not limited to being: a process running on a processor; a processor including an object, an executable, a thread of execution, and/or program; and a computer. Moreover, the various computer-related entities may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Programming Languages

Aspects of the system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Embodiments of the Basket Creation System and Method of the present invention facilitate liquidity and trading of non-transparent exchange traded products, such as the NEXTSHARES® products (NextShares Solutions, LLC), and other products with actively traded underlyings. Embodiments of the invention include a Basket Modeling Application (BMA) that integrates with specialized Exchange-Traded Product Order Management Systems (ETP OMSs) and other specialized trading infrastructure to automate and bring efficiencies to this process.

Conventional facilities available in the market for the operational management of passive ETFs (Exchange Traded Funds) do not meet the needs of active investing. Embodiments of the present invention, including the BMA, are intended to address those needs. In particular embodiments, the BMA automates the production of a daily basket, while maintaining the confidentiality of the securities selected and traded by the investment manager, meeting the regulations outlined by the SEC as it pertains to the basket and doing so within the operational environment currently in place for ETFs. These embodiments effectively retro-fit or leverage conventional systems to provide the enhanced capabilities shown and described hereinbelow. As noted, these embodiments are applicable to substantially any non-transparent active trading ETF scenario, such as currently permitted or as may be permitted in the future by the SEC, in which active managers are permitted to avoid exposing their trading. The systems and methods disclosed herein are thus configured to allow active managers to protect the intellectual property associated with their selection and trading of securities via rule based, automated processes. Particular embodiments also calculate the subsequent trading costs of using creation/redemption baskets that deviate from the portfolio.

One embodiment of the invention is now described at a high level with reference to FIG. 1. As shown, this embodiment includes a BMA (Basket Modeling Application) 34 communicably coupled to the fund's equity trading tool (fund management system) 44. An exemplary tool 44 is an order management system (OMS) commercially available from Charles River Development (CRD). BMA 34 is also communicably coupled (over secure transport—e.g., encrypted SFTP) to a primary market system 38, such as the Fund Connect OMS described below, with which Authorized Participants (APs) may interact to create and redeem shares of the fund (ETF). In particular embodiments, BMA 34 is implemented using a commercially available management system modified in accordance with the teachings herein. An example of such a management system is the Markit EDM data management platform commercially available from IHS Markit Ltd. London, UK.

In operation, at the start of the trading day fund system (OMS) 44 operates in a conventional manner to receive start of day positions from a fund database at 70. Throughout the trading day, the portfolio managers and the traders make decisions and trade via fund system 44 in a conventional manner. Also during the day, Authorized Participants interact with primary market system 38 in a conventional manner to create and redeem shares of the fund. The BMA 34 communicates with each of these otherwise independent systems 44, 38, to provide a mechanism for generating a more accurate picture of the status of the fund's holdings than provided by the fund systems 44 itself. The BMA 34 accomplishes this by capturing 72 data from system 44, at or after the close of trading for the day. This captured data provides the latest portfolio information for the fund, based on the various fund management operations that have taken place during the trading day.

As mentioned above, during the same trading day, primary market system 38 has been transacting with Authorized Participants to create and/or redeem shares of the fund, based on the creation/redemption basket published by the fund (e.g., via BMA 34) the previous day. For example, system 38 may have received, as shown at 74, five creation units of the fund, based on yesterday's creation basket that included two shares of IBM. Separately, fund system 44, based on the latest start of day positions captured at 70, and based on the day's management operations, believes at the end of the day that the fund holds 100 shares of IBM. However, in this example, in addition to the 100 shares of IBM on record with system 44, there will also be the shares of IBM in the five creation units received by system 38, i.e., an additional 10 shares of IBM. Thus, the information held by system 44 is inaccurate, in this case, by ten percent. This may cause the fund managers to continue to purchase additional shares of IBM in order to reach a desired target, when in actuality, the fund may have already reached its target for this security.

Embodiments of the present invention use BMA 34 to address this issue, e.g., by capturing 72 the latest portfolio information held by system 44, and by capturing 76 information from system 38, including the content of yesterday's basket, and the number of creation orders received during the day based thereon, to understand the real effect of those transactions on the portfolio. The present inventors have recognized that the above-described inaccuracies at the level of fund system 44 is a problem that has neither been recognized nor addressed because conventional ETFs are based on 'transparent' funds, e.g., funds that hold published indexes of securities, such that the creation/redemption baskets and the underlying fund may be essentially identical with little variation from day to day. The embodiments shown and described herein address the challenge of obtaining and translating disparate forms of data, generated and managed by disparate systems, and provide it to the fund managers in real-time, all while protecting the trading activity of the fund managers and traders by effectively applying rules automatically to help mask trading activity. In particular embodiments, this approach enables the fund's managers to effectively use the basket as a mechanism for adjusting their portfolio while preventing disclosure of the manager's trading plans, e.g., to help prevent front-running and the like.

These embodiments effectively retrofit and leverage conventional OMSs and infrastructure to address the technical problem of inaccuracies generated when such conventional systems are used to track the holdings of active ETFs. These embodiments also provide a novel user interface that enables users to view the enhanced-accuracy holdings dynamically, to visualize how those holdings would be affected by proposed rule-based portfolio changes, and to create and manage baskets to effect the proposed changes. This enhanced-accuracy and dynamic visualization of rule-based changes permits the baskets to be more closely correlated to desired holdings than prior art approaches, while maintaining a variance large enough to effectively mask the active trading of the ETF.

Figure 2:
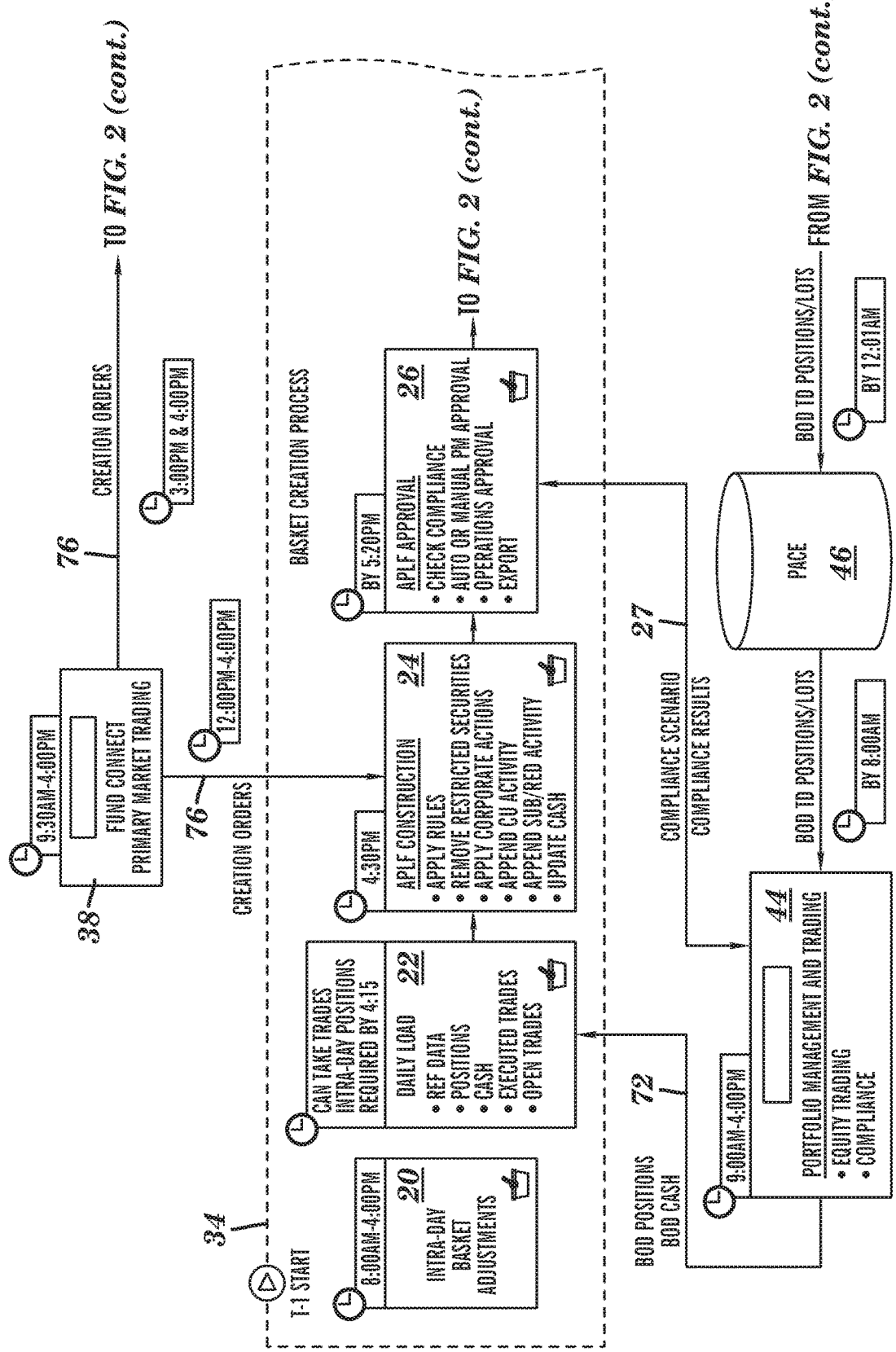
FIG. 2 is a detailed functional block diagram of the embodiment of FIG. 1.
Figure 2:
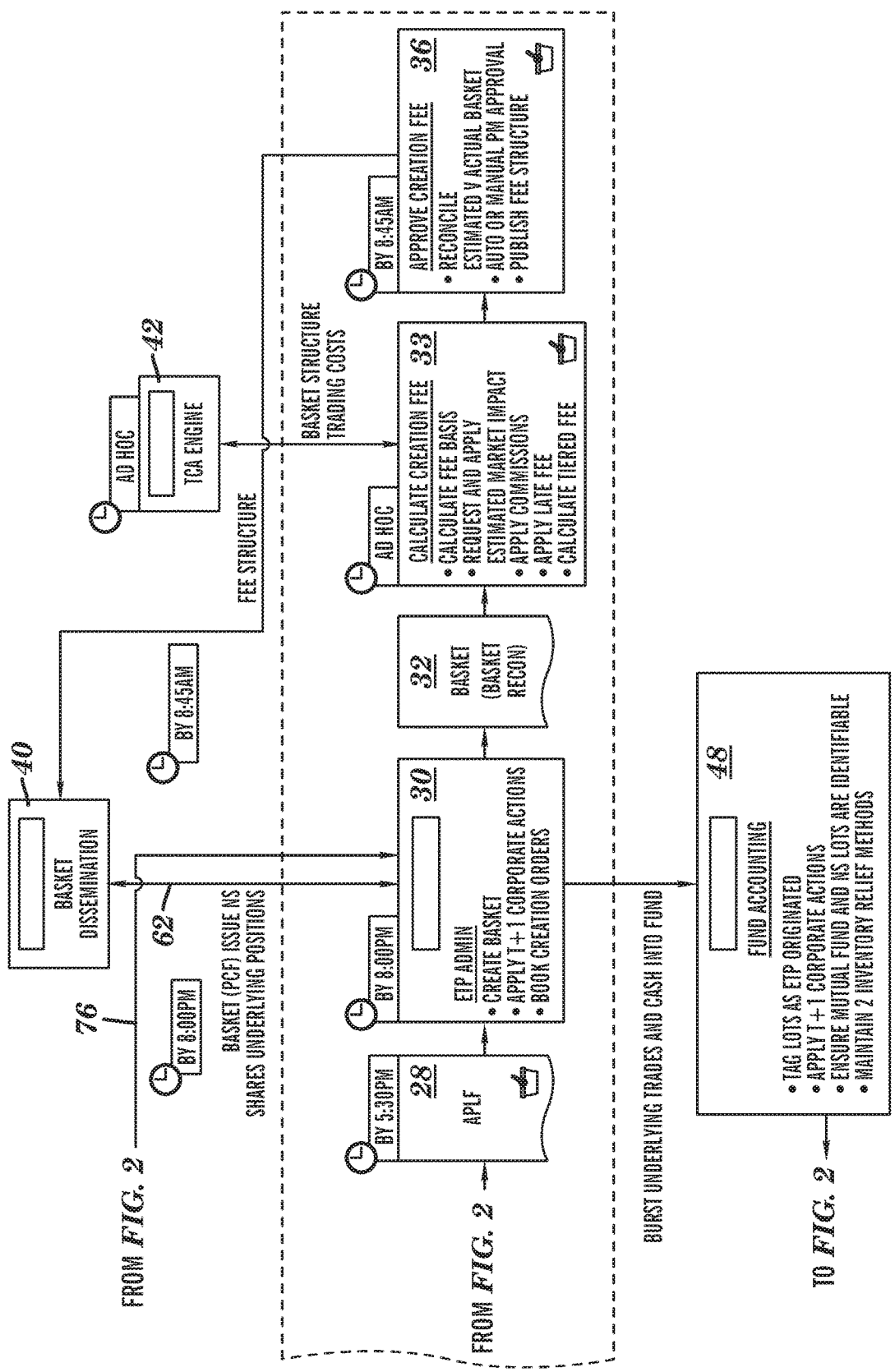

Particular embodiments of the present invention are shown and described in greater detail hereinbelow. Referring now to FIG. 2, these embodiments include a system configured to implement a series of process steps 1-6.

Step 1

Step 1: Basket Rules.

The BMA 34 offers a top down rules based approach to security inclusion as well as a bottom up security selection approach. The portfolio management team typically works with operations during business hours to ensure the settings are correct in preparation for creating the basket for tomorrow's trading, tonight. This is achieved using a customized rules engine 20 and UI (User Interface).

At step 1, the initial basket for the day is created with rules engine 20, e.g., at 8 am, for tomorrow's trading. Note that the system creates creation/redemption baskets on a T−1 basis, with T corresponding to the trading day. So, for example, beginning at 8 am on T−1, the portfolio manager and the operations team decide whether they want to make any rule changes to adjust the basket (and ultimately the fund portfolio) ahead of the tight window at the end of the day when the system actually calculates and processes the basket, as described in greater detail hereinbelow. It is at this point, with rules engine 20, that the manager/operations team may impose a top down rule (e.g., to adjust weightings in particular sectors or another appropriate grouping structure) which may have the effect of generating sell orders or otherwise transferring securities, or may impose a bottom up approach which selects particular securities and weights to be in the basket.

An example of a top down rule is to identify any open orders, e.g., for use in Step 3 (discussed below), to help ensure they are not exposed (i.e., publically disclosed). So the top down rule may be to simply look for all open orders across all positions. It doesn't matter what the positions are, the system will simply look for all open orders. Another example of a top-down rule is "move all my foreign securities to cash". So while bottom up rules are directed towards individual securities, top down rules are those in which individual securities are not named, i.e., top down rules may be viewed as being securities agnostic. Instead, the system simply looks across the portfolio, finds the particular characteristic, such as foreign securities, and takes the specified action, such as moving them to cash or re-weighting their value across other securities in the portfolio. These rules may be decided at any time throughout the day T−1, and may or may not be changed on a day to day basis.

Step 2

Step 2: Data Load (Ingredients)

The BMA 34 relies on positions, executed trades and open orders from the fund's trading system 44 for the basket construction process. Alongside this, it may receive supporting reference data for portfolios and securities.

For example, at 4:15 pm, as shown at 22, the system 34 interfaces with the fund's internal specialized trading systems 44 to capture 72 the Daily Load of data, e.g., reference data, security data, portfolio data, etc. In particular embodiments, the data captured at 72 may include positions, cash balances, executed trades, and open orders. This is the data that is reviewed and taken into consideration in Step 3 (discussed below) based on the results of Step 1. It should be noted that trading system 44 may include any one or more of various specialized systems, including trading systems for equities, trading systems for fixed income, and specialized trading systems for various other types of investments. Examples of specialized trading systems 44 include the Charles River IMS system commercially available from Charles River Systems, Inc. (Burlington, Mass.), the Aladdin® system available from Blackrock, Inc. (New York, N.Y.), the Bloomberg Asset and Investment Manager (AIM) available from Bloomberg L.P. (New York, N.Y.), the Perform® system available from Investortools, Inc. (Yorkville, Ill.), and the Everest™ system available from Black Mountain Systems, LLC (San Diego, Calif.).

Step 3

Step 3: Adjusted Portfolio Listing File (APLF) Construction.

In Step 3, additional data that trading system 44 may be unaware of is collected (from primary market trading system 38 at 76 over secure transport—e.g., encrypted SFTP), to supplement the positions captured at 72. This may include today's creation order activity (on yesterday's basket) and subscription/redemption activity on mutual fund feeders. The process then applies the active rules (from rules engine 20), including any standing rules such as removing restricted securities, removing securities with a corporate action going ex-dividend tomorrow and making any desired manual changes. This can be considered a filtering exercise which removes full or partial positions from the basket and replaces their value with cash or other securities.

As shown, beginning at around 4:30 pm, APLF construction module 24 begins constructing an Adjusted Portfolio Listing File (APLF), which is essentially an updated proposed basket, consisting of the updated position data generated at Step 2, after applying the rules of Step 1.

The APLF construction engine 24 thus applies the rules of Step 1 and automatically removes any restricted securities from the APLF. For example, any securities that according to the rules, the fund is restricted from buying, are removed from the APLF. Similarly, corporate actions are applied, i.e., if any corporate action is scheduled for tomorrow, then that company's stock may be removed from the basket.

As mentioned above, the basket the BMA 34 creates today (at T–1) is for trading (creating/redeeming) tomorrow (T). Therefore, creations/redemptions occurring today are using the basket created the previous day (T–2). And as discussed, trading tool 44 is not necessarily aware of that, i.e., is not aware that out in the primary market, via primary market trading system 38, authorized participants have been engaging in creations/redemptions with the fund. This Step 3 therefore updates the APLF based on, e.g., the five creation orders in progress discussed above with respect to FIG. 1, to reflect how the pending creations (and rules of Step 1) would change the fund portfolio, and correspondingly, today's basket. Embodiments of the present invention capture this data by interfacing with the primary market OMS 38 and downloading this order information at 76 to APLF construction module 24.

Module 24 thus captures today's creation/redemption information at 76, and applies the information to provide an accurate view of the current state of the fund portfolio. Module 24 also applies the rules of Step 1 (rules engine 20), updates cash, etc., to generate the APLF quickly, effectively in real-time. It should be recognized that the system helps provide an accurate view of the current portfolio, to which the rules of Step 1 may be applied in order to generate an APLF that may be accurately weighted towards those holdings the fund manager wants to adjust. Moreover, it should be noted that in particular embodiments, this is accomplished without revealing the fund manager's trading strategy, as will be discussed in greater detail hereinbelow.

An example of a trading system 38 useful with embodiments of the present invention is the Fund Connect™ create/redeem order management system commercially available from State Street Corporation (Boston, Mass.).

Step 4

Step 4: APLF Approval.

APLF Approval engine 26 is configured to approve the APLF to create the day's basket. The fund manager/team has previously approved the rules (using rules engine 20 at Step 1) and may re-approve at this Step 4 if changes to the Step 1 rules are desired. Engine 26 creates hypothetical activity scenarios on the basket, to anticipate how the fund holdings would change based on receiving various numbers of creation/redemption orders tomorrow. As a safety net, post trade compliance (e.g., handled by system 44) runs checks based on these activity scenarios to ensure there is an adequate buffer of securities in the fund. Once the results of this post trade compliance have been sent at 27 to engine 26, the operations team then approve the APLF via engine 26, which then sends the APLF at 28 to the ETP administrator 30 (e.g., via secure transport—e.g., encrypted SFTP) for further processing.

Described in greater detail, the approval engine 26 takes the proposed basket (APLF) and runs scenarios to determine how the fund portfolio would change based on various numbers of hypothetical creation/redemption orders potentially received the next day, and sends the scenarios at 27 to trading system 44. System 44 then runs a post trade compliance check on the scenarios to make sure the fund would continue to satisfy any applicable compliance rules, e.g., to determine whether any of the likely scenarios would put the fund outside its stated weightings. The APFL Approval module 26 thus takes the portfolio as it is at the end of the day (Step 2) plus any pending creation orders (Step 3), then applies the effect of hypothetical creation order scenarios on the proposed basket (APLF) and sends it to compliance. In particular embodiments, compliance is handled by the fund's internal trading system 44. If Compliance finds no issues, then the proposed basket is ready for approval, at which point the operations team approves and sends it at 28 to the Exchange Traded Product (ETP) administrator 30 (e.g., via secure transport—e.g., encrypted SFTP) for Step 5.

Step 5

Step 5: Basket Creation and Reconciliation.

The ETP administrator 30 converts the APLF into the official basket and sends it at 62 to a post-trade financial services module 40 for public dissemination, i.e., for next day trading. The BMA 34 also takes the official basket 32 at fee calculation engine 33, as discussed hereinbelow with respect to Step 6.

ETP administrator 30 also receives 76 (over secure transport—e.g., encrypted SFTP) the creation orders from primary market module 38 and passes the underlying trades and cash information to the fund accounting module 48, which as shown, is communicably coupled to the fund's data warehouse 46. The data warehouse 46 is communicably coupled to the fund's trading system 44. In particular embodiments, ETP administrator 30 is provided by State Street Bank, although any number of ETP Administrators may be used, such as JP Morgan (New York, N.Y.), BNY Mellon (The Bank of New York Mellon, New York, N.Y.), Brown Brother Harriman & Co. (New York, N.Y.). In particular embodiments, fund accounting module 48 is also provided by State Street Bank, and data warehouse 46 is the Eagle PaceTM system commercially available from BNY Mellon, which is an enterprise data management system typically used to cleanse and distribute data to multiple processes and systems across an organization. Fund accounting module 48 is responsible for daily cost basis accounting for the fund, including corporate action processing, GL (general ledger) and NAV (net asset value) calculation. Also in the example shown, post-trade financial services module 40 is provided by the DTCC (Depository Trust & Clearing Corporation). Any number of commercially available clearing and settlement services may be used with embodiments of the present invention.

Step 6

Step 6: Creation Fee Calculation.

The fee calculation engine 33 calculates a variable fee for a creation order in Step 6. Fundamentally, this process calculates what it will cost the portfolio manager to align the end state (official) basket 32 with the actual portfolio—what he or she will have to buy or sell in order to negate the value movements caused by the process of keeping the strategic decisions of the portfolio manager protected. Market impact is calculated using a total cost analysis (TCA) tool (engine) 42 and average commission rates are applied. The fee calculation process may vary based on liquidity and data availability. The fees then may be published externally to any number of locations (not shown).

The variable creation order fee is calculated on a daily basis when the (official) APLF 32 is generated. The fee calculation will vary based on the assets held in the fund. The primary components used to calculate the fee rate (basis points) are market impact (discussed below), spread, trading commissions and settlement costs. The rate is calculated at varying frequencies, at the discretion of the investment team depending on market volatility. The actual dollar amount of the fee is calculated on a daily basis, by applying the rate to the value of the deviation (e.g., variance) between the actual holdings of the fund and the APLF or by applying them to the cash in the APLF, ultimately calculating the costs of re-baselining creation orders back to the strategic weightings of the fund or investing the cash in the APLF.

Described in greater detail, Step 6 involves essentially looking at the results of the preceding Steps 1-5. Fee calculation engine 33 looks at the cash movement, the value movement between either: securities and cash; or securities and other securities; based on the rules we applied. Engine 33 then determines the dollar value against which a fee should be charged. As mentioned above, one aspect of the fee is commissions. The system determines what the fund will need to pay in commissions in order to purchase securities that have been excluded from the basket, e.g., those securities that have been excluded in order to avoid publically disclosing the identities of those securities of interest. Another aspect is market impact. For example, if the fund buys 20 shares of a particular stock, that activity will tend to move the price of that stock in the market, in this example increasing the price, and therefore the cost to the fund to obtain additional shares of the stock will increase. The TCA tool 42, which is communicably coupled to engine 33 (via secure communication—e.g., HTTPS, encrypted SFTP), calculates a rate (e.g., in basis points) intended to represent the cost associated with that movement, and supplies the rate to engine 33 for application of the rate to a dollar amount of movement. An exemplary TCA tool 42 is the Trade Analysis Program—TAP commercially available from Trade Informatics, LLC (New York, N.Y.). The dollar amount of movement is determined based on the extent to which the basket deviates from the fund. The fee rate multiplied by the dollar amount of movement, plus the applicable commissions and settlement costs, is the fee that gets passed on to the authorized participants in the fund.

Turning now to FIGS. 3-15, aspects of particular embodiments of the present invention will be described in greater detail.

Creation Process (20, 24, 26, 27, 28, 30, 32)

Figure 3:
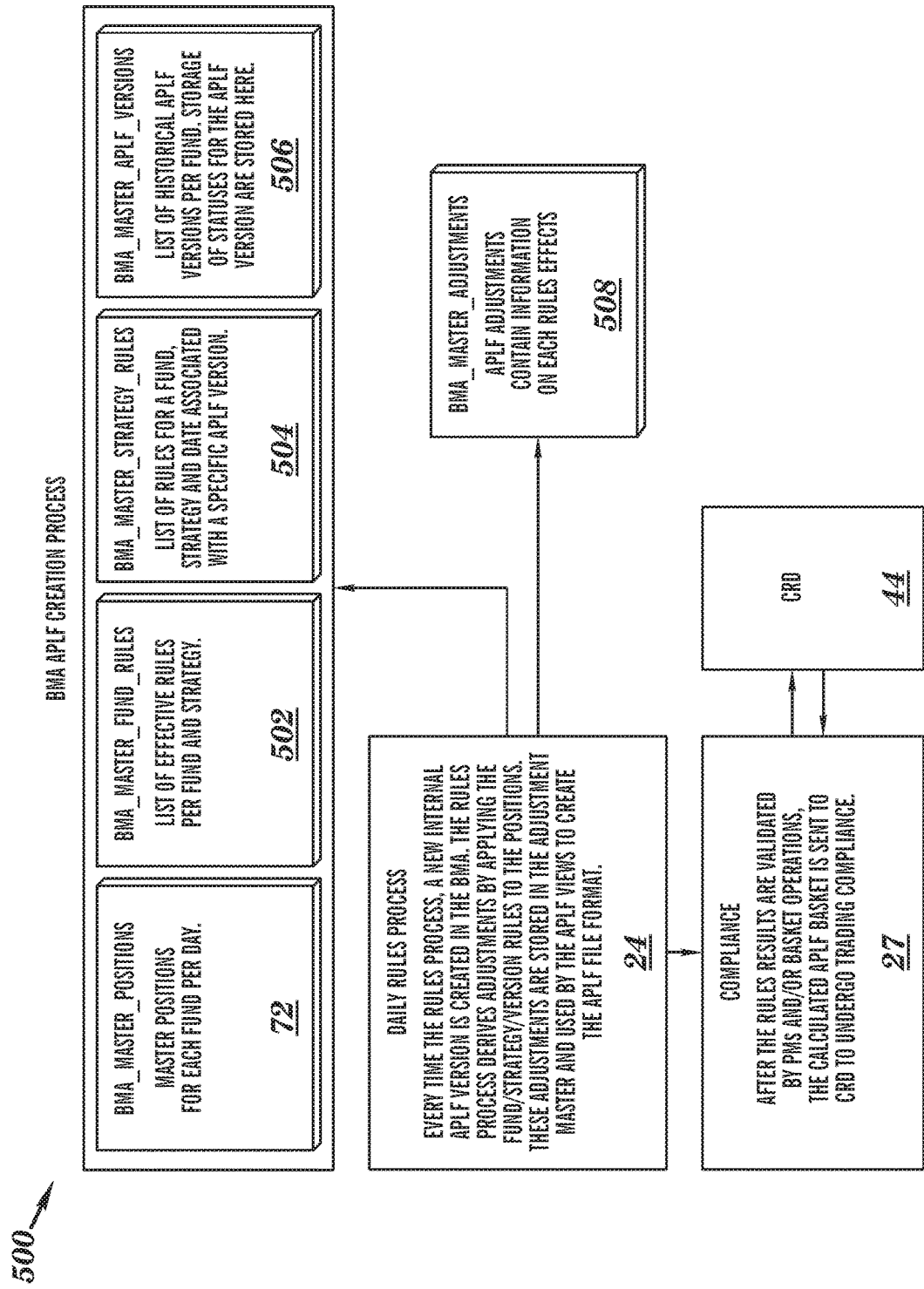
FIG. 3 is a flow chart of a process used with the embodiments of FIGS. 1 and 2.
Figure 3:
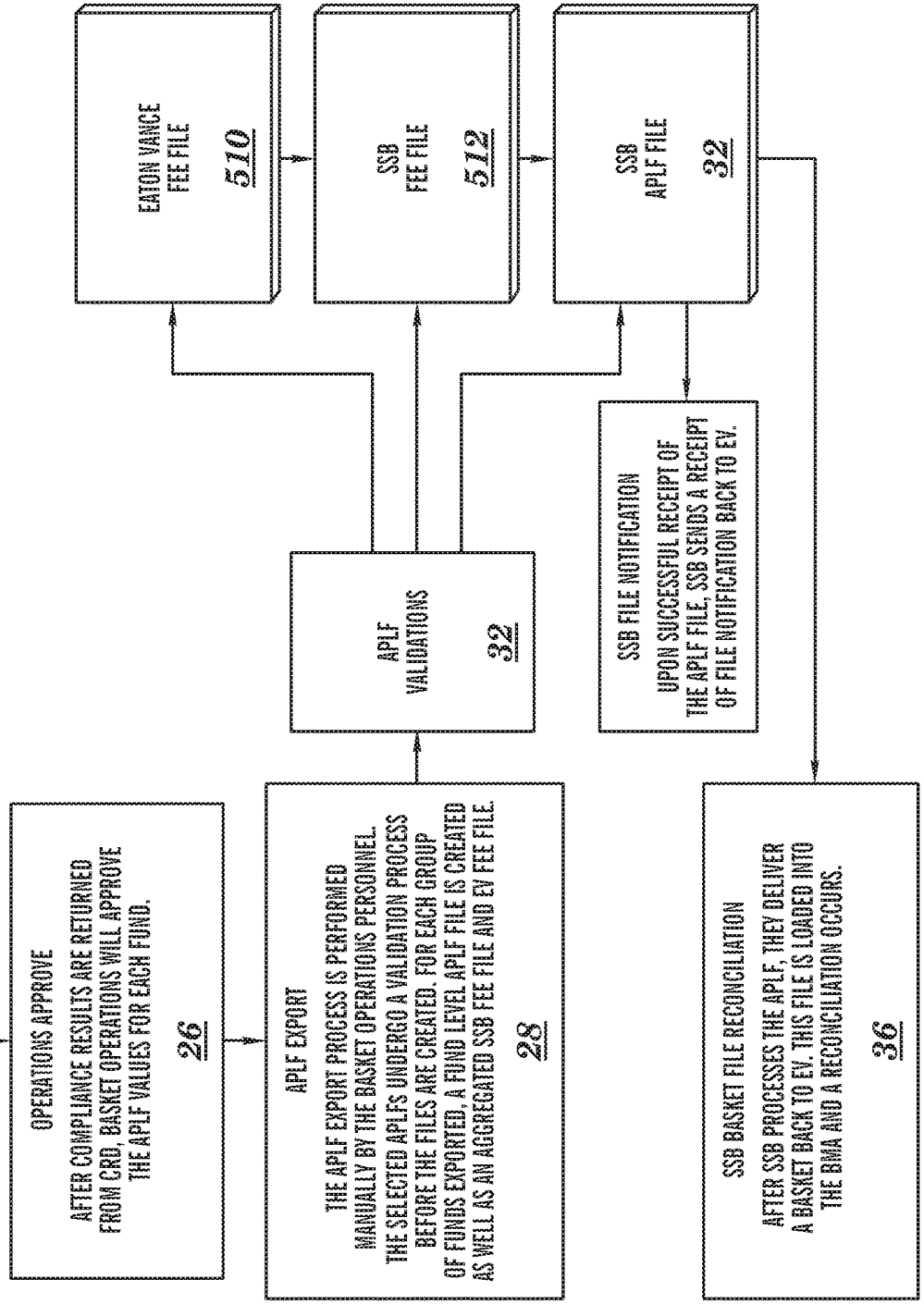

As described hereinabove, BMA 34 (e.g., at 20, 24, 26, 27, 28, 30 and 32 of FIG. 2) calculates and stores an APLF which is supplied to ETP Administrator 30. Referring now to FIG. 3, in particular embodiments, on a daily basis, the APLF creation process 500 involves the following:

Step 1

Portfolio Managers define the strategy for their fund. These strategies include one or more of:
  Top Down, Bottom Up, All Cash, or Static approaches
  Portfolio Managers (PMs) and Basket Operations build and configure rules for the current fund/strategy combination, with Rules Engine 20/APLF Construction Module 24, including Master Fund Rules 502 and Master Strategy Rules 504.

Step 2

Rules are run automatically and on demand by both PMs and Basket Operations at 24, e.g., upon receipt of data from Data Load module 22 (FIG. 2) to create an initial APLF. The construction module 24 is responsible for calculating the APLF adjustments used to create the APLF file.

APLF results are reviewed and then sent to compliance at 27 for trading violation verification.

Operations team approves the APLF results at 26.

The APLFs are exported to files at 28 and sent to ETP Administrator 30.

ETP Administrator returns a basket 32 to the BMA, where it is reconciled against the APLF file 28 at module 36. This process includes sending basket 32, along with fee files, e.g., a Fund Fee File 510 including the Fund's fee, and an ETP Admin Fee File 512 including the administrator's fee, to the creation fee module 33 to calculate a creation fee, which is approved at 36.

Construction Engine (24)

Figure 4:
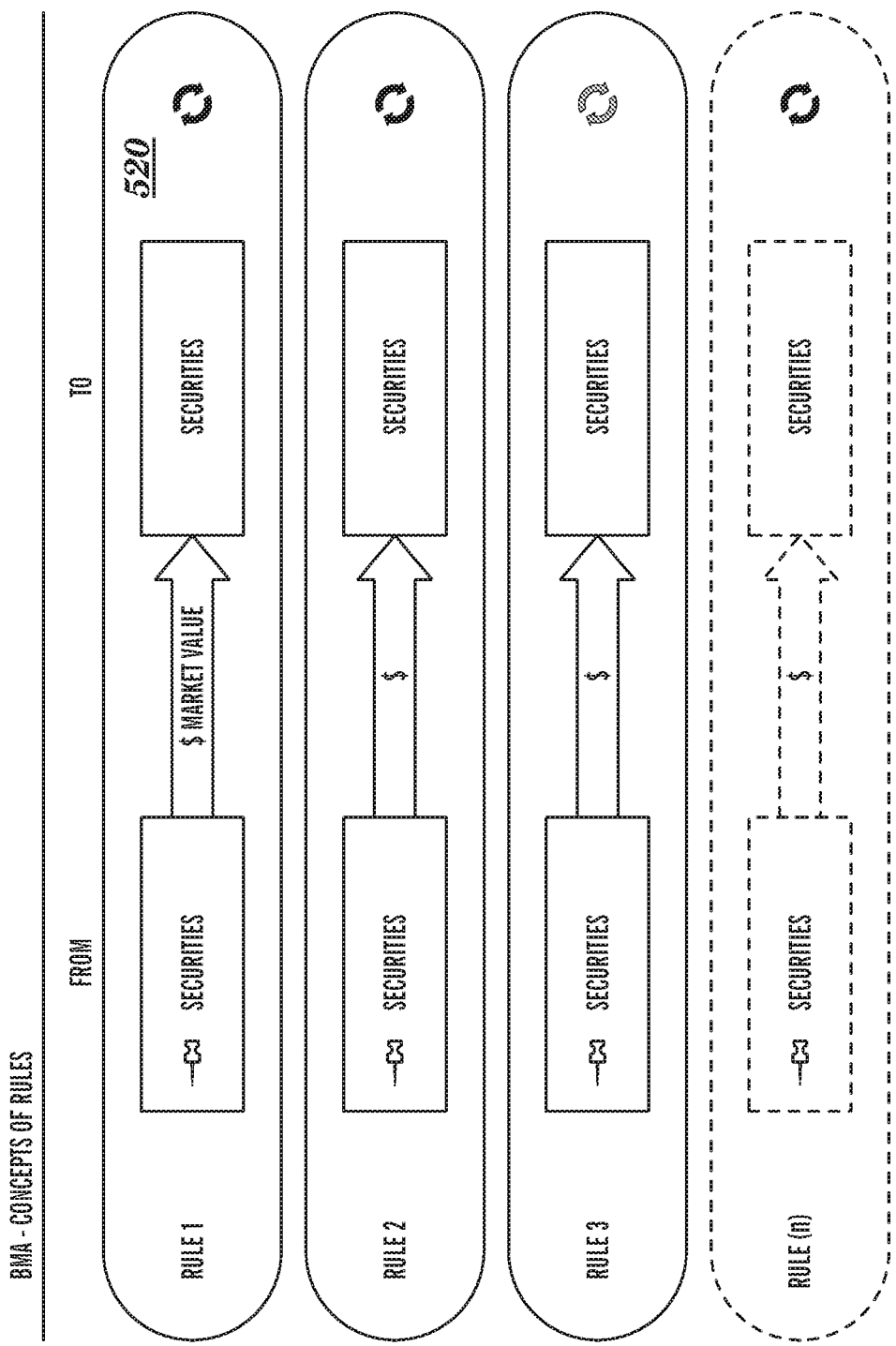
FIG. 4 is a graphical representation of rules used in embodiments of the present invention.

Turning now to FIG. 4, a representative use of rules 502 and 504 by APLF construction engine 24 is described.

An individual rule 520 allocates value from positions meeting defined criteria to other positions meeting defined criteria.

All rules have 2 sides: From and To (or Left and Right or Debit and Credit.)

Rule Attributes

"From" Position Selection, based on security or position attributes

"To" Position Selection, based on security attributes, or pro-rata across the non-selected positions in the portfolio Rule Type Defined Types of Rules and Position Selection Reallocate: moves 100% of the market value of the "From" selected securities to a pro-rata allocation of the "To" securities. "From" and "To" Position selection is based on security type information found in the security master 504.

Freeze Open Orders: Reverts a position back to the share amount it was before any consecutive open and executed orders leading to the current position Manual Adjustment: Allows the user to define a specific market value, share amount or weight.

Reallocate Restricted Securities: Sets restricted securities to 0

Reallocate Corporate Actions: Sets securities with a pre-defined set of corporate actions currently active to 0.

Rule Assignment Attributes

Product Assignment

Date Range

Sequence: Since multiple rules may be assigned to a product for a date, the sequence is important. Each rule assumes a starting position based on the rule(s) that ran before it. For example, if a position was $1,000 and Rule 1 changes it to $0, Rule 2 assumes a beginning value of $0 for that position.

Pinned/Not Pinned

Rules may be "Pinned" which enforces that the market values of the securities selected may not be changed by subsequent rules For the purposes of pinning, the "From" selection is assumed to be the focus, and is therefore what securities get pinned. "To" selections are not pinned.

Transactions/Audit

Each rule moving value from any securities to any securities will create records representing the transactions, which capture the rule that ran, the position impacted, the versions of the rules applied, the amount, and which side it was on (From or To.) In this way, there is a detailed transaction history so every basket can audited.

Exceptions

Any rules that do not balance (the From side is not equal to the To side) the transactions will not be completed, the rule will essentially not take effect, and an error will be created in an error log. This may happen for a few reasons, but a simple example is if a user tries to move value to only 1 security and that security was pinned by another rule.

Figure 5:
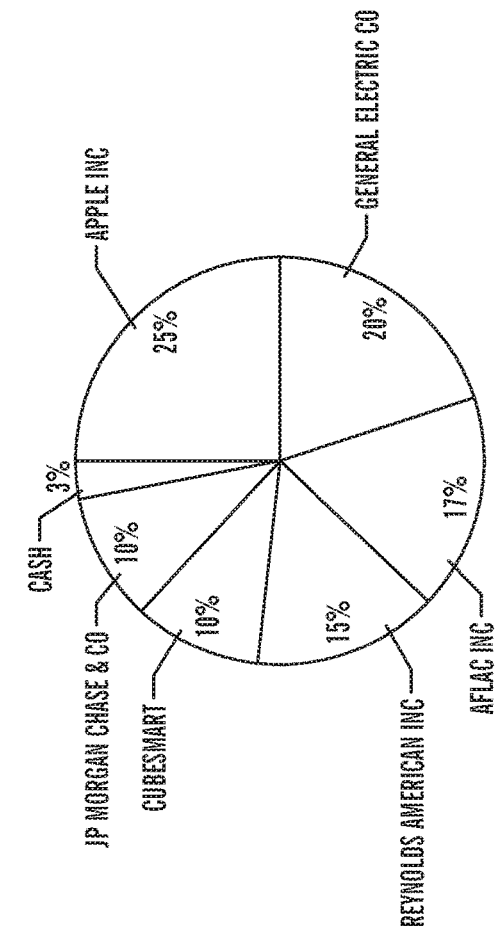
FIG. 5 is a display of a graphical representation generated by embodiments of the present invention.

Turning now to FIG. 5, an example of a set of rules implemented by APLF construction engine 24 includes the portfolio of securities shown at table 520. Exemplary rules include: Allocate REITs to Cash; Allocate non-banking Financials to Cash; Hide Open Order Activity; and Allocate Cash to Remaining Securities. As described above, these rules will be implemented in order. The results of implementing these rules are shown in Table 530 of FIG. 6. As shown, the weightings of Apple, GE, Reynolds American, and JPMorgan have been increased proportionately.

APLF Approval (26)

Figure 7:
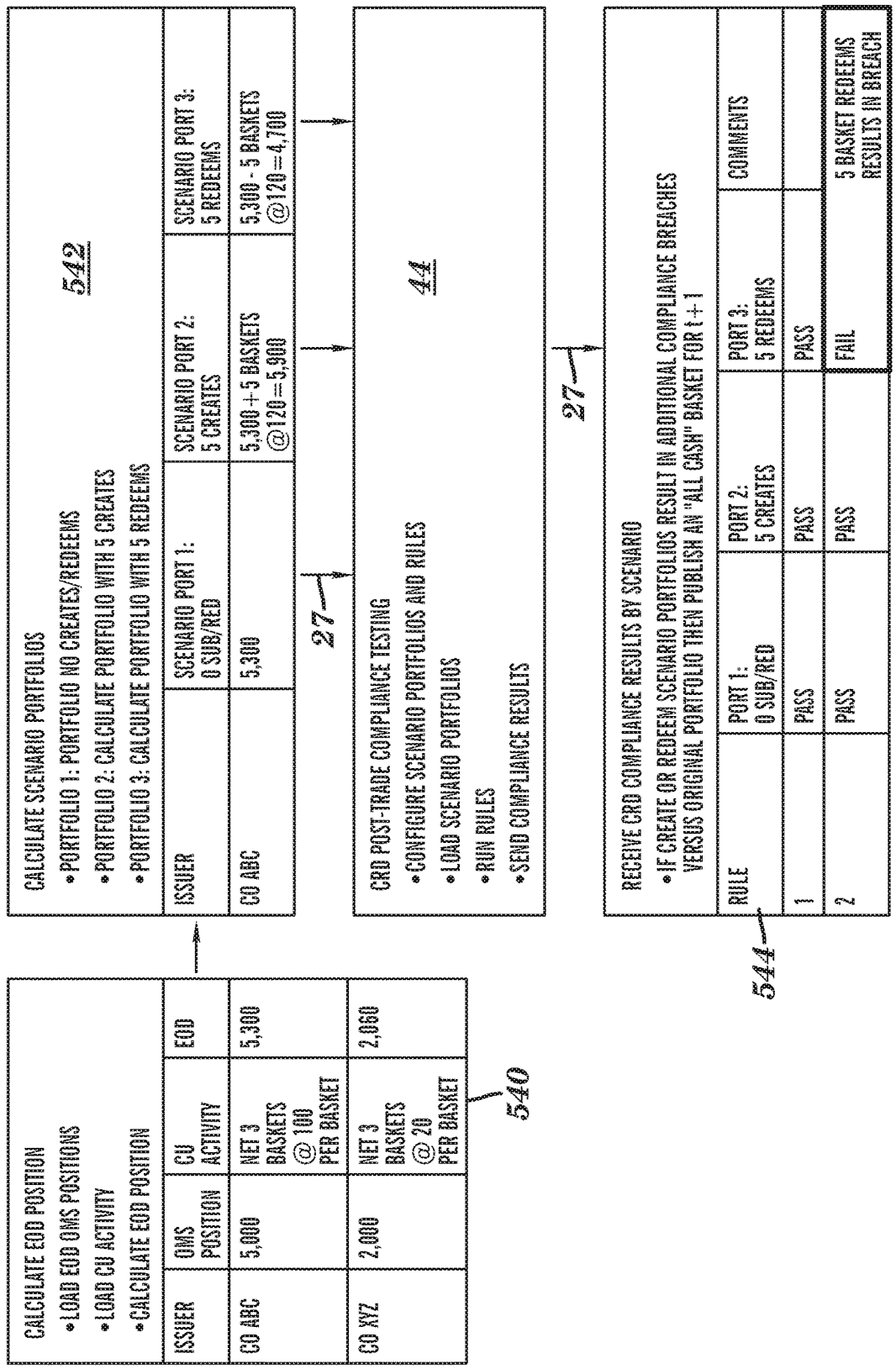
FIG. 7 is a series of displays of a graphical user interface generated by embodiments of the present invention.
Figure 8:
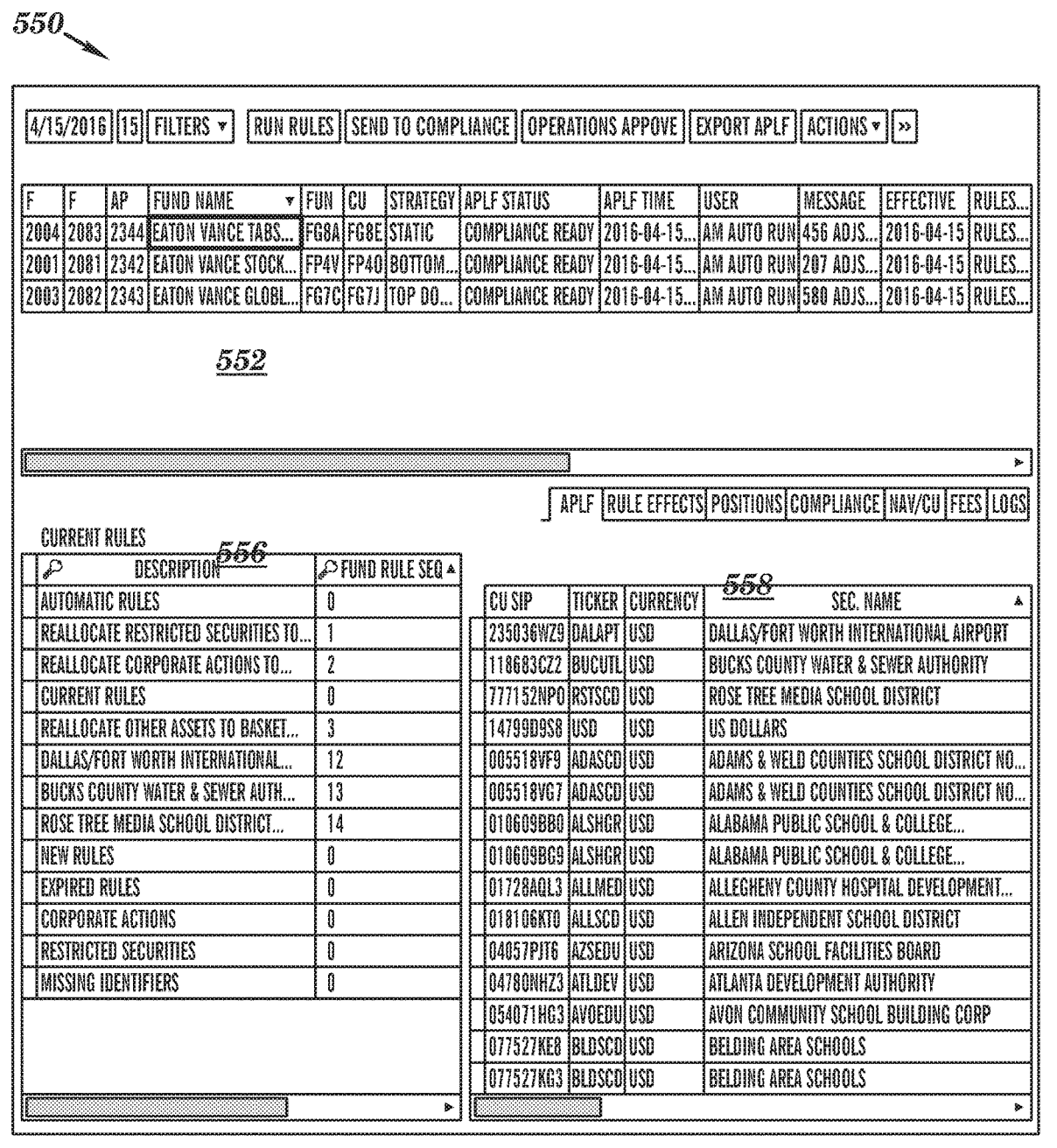

Turning now to FIGS. 7-9, an exemplary process is shown and described, by which APLF Approval module 26 checks basket compliance for specific scenarios, in combination with a third party compliance engine 44. As shown in FIG. 7, APLF Approval module 26 calculates and displays End of Day (EOD) positions 540 for the fund based on data held by the OMS 44. Module 26 then creates and displays various scenario portfolios at 542. In the example shown, scenario portfolio 1 anticipates no creates or redeems. Scenario portfolio 2 anticipates 5 creates, and scenario portfolio 3 anticipates 5 redeems. These scenario portfolios are then sent at 27 (along with the rules generated by rules engine 20) to OMS 44 for compliance testing. This compliance testing includes loading the scenario portfolios and the rules, running the rules on each of the scenarios, and sending the results back to approval module 26. The results are shown in display 544. In the examples shown, all three of the scenario portfolios comply with Rule 1, and scenario portfolios 1 and 2 comply with Rule 2, as indicated by the "Pass" designation. However, scenario portfolio 3 fails to comply with Rule 2, as shown.

Turning now to FIG. 8, a screenshot of the operations dashboard 550 generated by construction module 24 of BMA 34. The Operations Dashboard is used to monitor and create an APLF file. In the embodiment shown, dashboard 550 includes a status bar 552 which displays the fund name, strategy (e.g., static, bottom up, top down), status (e.g., whether or not the fund is ready to be checked for compliance), effective date (e.g., the date of the latest change in status), and the state of the rules (e.g., whether or not the current rules have been approved).

Dashboard 550 also includes a current rules panel 556 listing each of the rules applied to a particular fund highlighted in status bar 552. In the example shown, rules are shown for the Eaton Vance TABS 5-to-15 Ladder Muni NextShares fund, which is highlighted in the status bar 552. A securities listing panel 558 lists the securities held by the highlighted fund.

Referring to FIG. 9, a screenshot of a Basket Approval UI 560 is shown, which enables users to configure rules (using rules engine 20) and baskets. A rule status panel 562 enables users to view rules for a particular fund, selected based on various parameters, such as automatic rules, current rules, and whether the rules are top down or bottom up. In the example shown, bottom up rules have been selected for display in panel 562. Panel 562 also permits users to add, edit, or end individual rules. A position scratch pad 564 displays current securities holdings according to the latest data held by the fund's OMS 44, including weightings of each of the securities (e.g., actual and customized), actual quantities, and the "To-From" allocation specified in rules affecting the weightings of each security. This display of data, as discussed hereinabove, includes both the latest portfolio information held by system 44 (captured at 72), and information from system 38 (captured at 76), including the content of yesterday's basket, and the number of creation orders received during the day based thereon, to display the real effect of those transactions on the portfolio. The scratchpad 564, by displaying data including all of these inputs, thus provides an accurate snapshot of the fund, which is effectively real-time, to enable users to make timely rule changes capable of making relatively fine-tuned adjustments to the fund portfolio. This real-time information also enables baskets to more closely conform to the actual fund holdings than would be the case if the user was working from less complete data, such as would be the case if the user had access to data from OMS 44 but not from system 38. As mentioned above, baskets created by using this less complete data tend to be more divergent, i.e., have a greater variance, from the actual fund holdings than would otherwise be required to shield the fund manager's strategies from front runners, etc. Greater divergence generally correlates to greater expenses to the fund, due to the trading costs of conforming the baskets to the fund holdings. However, by using the actual data from system 38 instead of estimates, the basket may more closely approximate the actual fund holdings without the risk of revealing the fund manager's strategy.

APLF Extract File (28)

Once the APLF Approval process is complete, the basket values are extracted at Extract File module 28, to create an APLF file, which is then sent to ETP Administrator 30. An example of the file, in a CSV format, is shown in Table I:

TABLE I

| FIELD | DESCRIPTION |
|---|---|
| Fund | fund code as known by ETP Administrator |
| ISIN | security ISIN identifier |
| CUSIP | security CUSIP identifier |
| TICKER | security TICKER identifier |
| SEDOL | security SEDOL identifier |
| Currency | ISO currency code for the security |
| Description | security/issuer name/description |
| Country Restriction | Country trading restriction (Y/N). Security types CASH, BMACASH and CURR get set to "Y". |
| Trade Country | security country code |
| Basket Shares | Estimated basket shares, factored down to a single CU. |

Calculate Creation Fee (33)

Calculation Logic

As described above, the BMA fee calculation process implemented by Creation Fee module 33 calculates and stores a set of daily fee values which are supplied to the ETP Administrator 30 (and optionally, to the fund's web site) as part of the daily APLF process. The process involves a combination of automated and user-directed steps. The process is flexible enough to handle future variations of the fee structure.

In representative embodiments, the daily fee process calculates a total fee and an all cash fee using the following formulas:

$$\text{Total Fee} = (\text{Market Impact} + \text{Commission} + \text{Settlement Cost} + \text{Market Impact Adj}) * \text{Basket Cash Balance} \quad (1)$$

$$\text{Total Late Fee} = (\text{Market Impact} + \text{Commission} + \text{Settlement Cost} + \text{Market Impact Adj} + \text{Late Penalty}) * \text{Basket Cash Balance} \quad (2)$$

$$\text{All Cash Fee} = (\text{Market Impact} + \text{Commission} + \text{Settlement Cost} + \text{Market Impact Adj}) * \text{Basket Value} \quad (3)$$

Note that the foregoing is used to calculate a fee based on the cash in the basket. An alternative approach is to calculate the value of the deviation between the APLF and the Fund, and then calculate a fee based on that deviation, as follows:

$$\text{Total Fee} = (\text{Market Impact} + \text{Commission} + \text{Settlement Cost} + \text{Market Impact Adj}) * \text{APLF to Fund Deviation Amount} \quad (1)$$

$$\text{Total Late Fee} = (\text{Market Impact} + \text{Commission} + \text{Settlement Cost} + \text{Market Impact Adj} + \text{Late Penalty}) * \text{APLF to Fund Deviation Amount} \quad (2)$$

Market Impact is the weighted average market impact as calculated by TCA Engine 42. An exemplary market impact process involves:

sending a list of holdings to TCA Engine 42
receiving a file of calculated market impacts per position
calculating and storing a periodic total weighted market impact value used for daily fee calculations Commission can be set based upon the fee_category_code associated with a security on the security master record. The default is 5 bps if no category code mapping is found.

Settlement Cost is an optional user supplied value.

Market Impact Adjustment is an optional user supplied value.

Late Penalty is an optional user supplied adjustment.

An optional user entered Fixed Fee is also sent to ETP Administrator 30 if defined. This value is sent as entered with no additional calculations.

Figure 10:
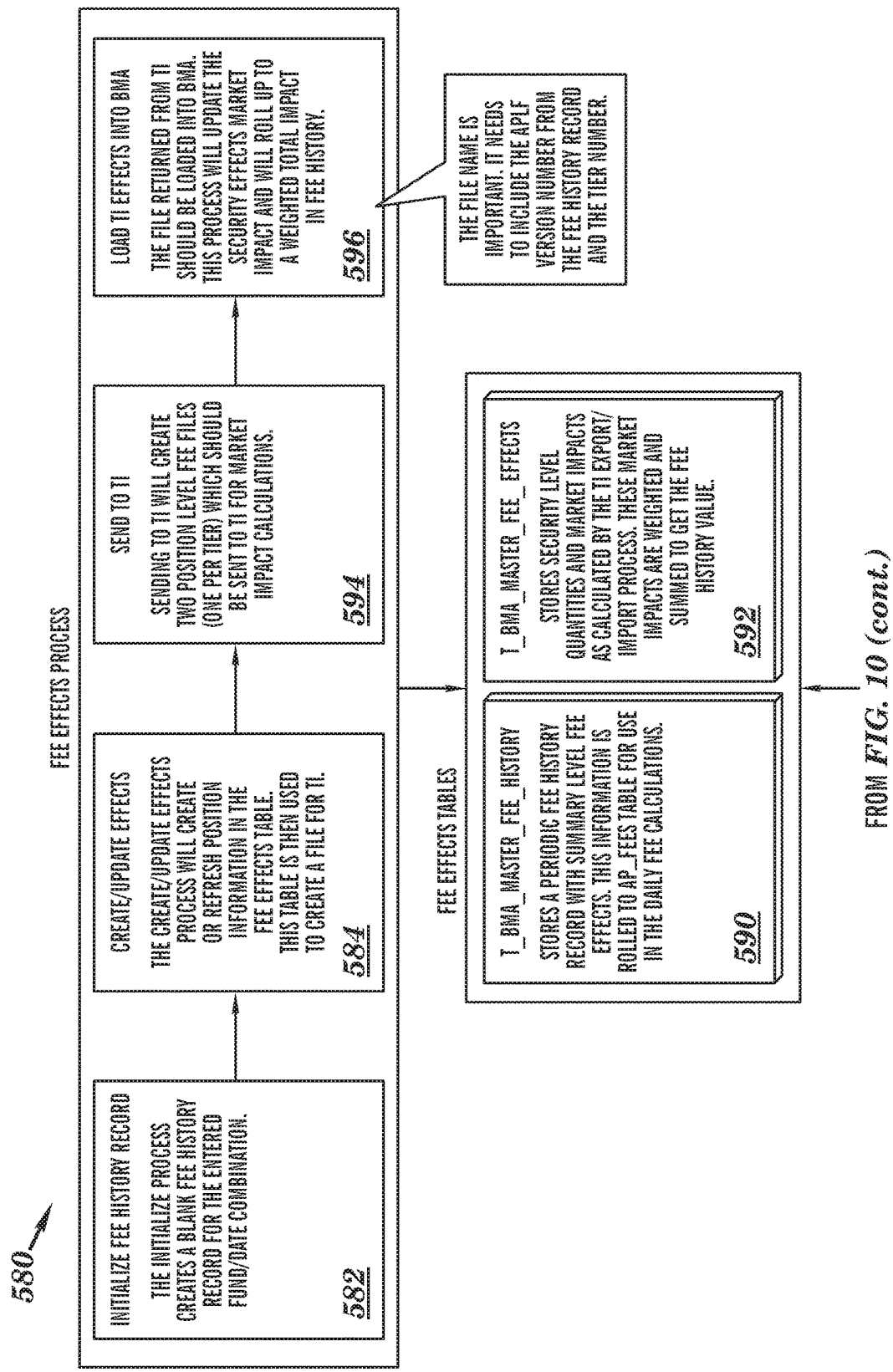
FIG. 10 is a flow chart of a process used with embodiments of the present invention.
Figure 10:
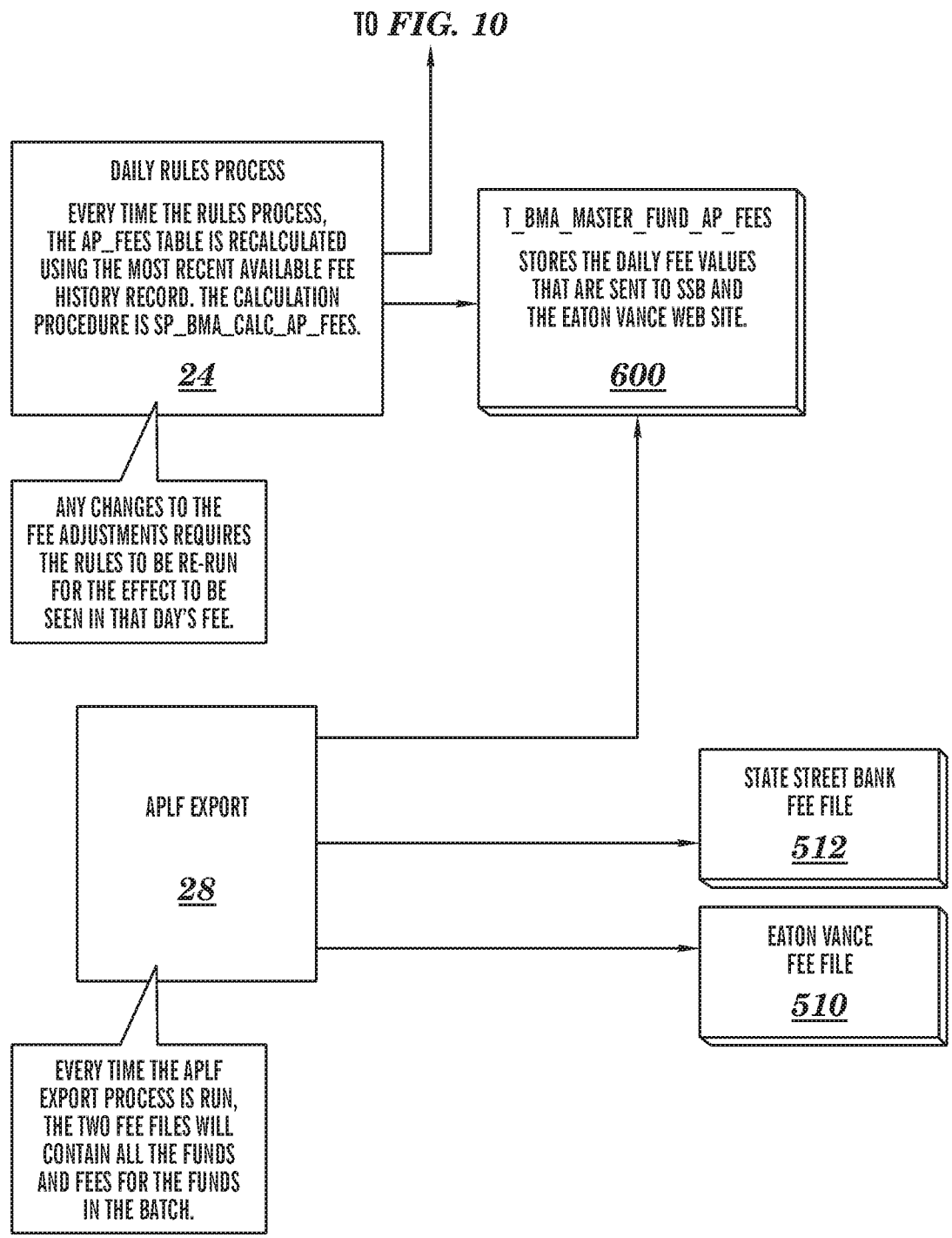
Figure 13A:
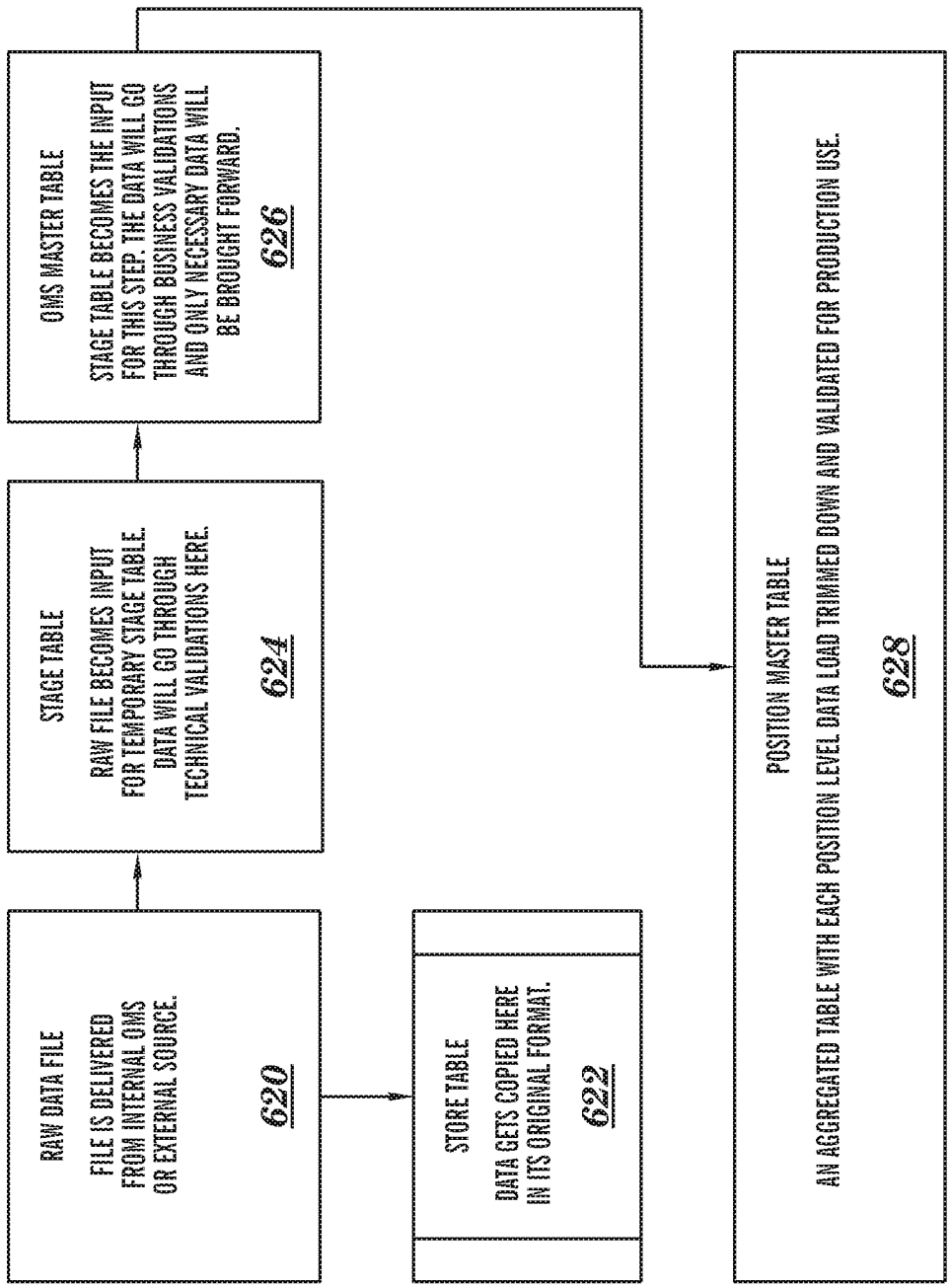
FIG. 13A is a flow chart of a process used with embodiments of the present invention.

An exemplary Fee Effects Process 580 is described with respect to FIG. 10. As shown, an initialize process 582 creates a blank fee history record for a fund/date combination. A create/update effects process 584 creates or refreshes position information in fee effects tables 590, 592 (described hereinbelow), which form the basis of the basket file 32 (FIG. 2) sent to TCA Engine 42. Transmission process 594 sends tables 590, 592 to TCA Engine 42 (FIG. 2). Note that in particular embodiments, process 594 creates two or more sets of position level fee files 590, 592 (e.g., one set for each cost tier). In this regard, it should be recognized that the fees for creation baskets tend to increase as the number of creation units increases. This is primarily driven by the market impact component of the fee. As the size of an order increases, the impact on that security's price may increase, placing it into a higher cost tier. This use of cost tiers helps ensure that the costs of trading large quantities are absorbed in the creation order itself rather than by existing holders of the fund. It should also be noted that the cost tiers may be based on various factors e.g., security type and/or liquidity, as well as order size. TCA Engine 42 uses the received fee effects tables 590, 592 to complete market impact calculations. Load process 596 receives a file including market impact information for each cost tier, returned from TCA Engine 42, decrypts the file, and loads it into BMA 34. This process uses the market impact information to generate a weighted total impact value. In particular embodiments, the name of the file received from TCA Engine 42 needs to include the APLF version number from the fee history record created at 582, and the tier number.

As shown, the Fee Effects tables include a Master Fee History table 590 and Master Fee Effects table 592. Table 590 stores a periodic fee history record with a summary level fee effects. This information is rolled into an AP Fees table 600 for use in the daily fee calculations. Fee Effects table 592 stores security level quantities and market impacts as calculated by the TCA Engine 42. These market impacts are weighted and summed to provide a fee history value.

As also shown, tables 590 and 592 receive periodic updates from APLF Construction module 24 when rules are processed, e.g., via modules 26, 28, 30 and 32. The updated tables 590 and 592 are then used to recalculate the AP Fees table 600. Table 600 includes daily fee values that are sent to ETP Administrator 30, and optionally, to the fund's website, e.g., via files 512 and 510 as shown.

Market Impact Process 42

Turning now to FIG. 11, exemplary aspects of the operation of TCA Engine 42 are shown as described. In particular embodiments, as described above, the daily fee process requires a fee history record to use as the basis for fee calculations. The fee history record is stored periodically as created by the user. The market impact value is calculated by sending a file to TCA and receiving a response file or by entering the value manually which is stored in the BMA on the fee history record. The method of TCA calculation will be dependent on portfolio strategy.

A basket operations user initializes a fee effects record in the Creation Fee Management utility 610 shown in FIG. 11, by selecting a fund from a displayed list of funds. Utility 610 includes a display of various aspects of the funds, such as fund name, effective date of most recent update, status, fund code, market impact, etc.

After initializing a fee history record, the user can set optional fields by right mouse clicking on a record and updating values shown in FIG. 12. The settlement cost, fixed fee and average trade size will roll from a previous fee history once set.

The user then creates (or updates) the fee effects per fund. This process pulls a fund's positions from the BMA master position file 72 (FIG. 3) to create a list of quantities to send to TCA Engine 42. Two types of quantities are stored:

Quantity=position master shares*CU factor*Tier CUs

Average trade quantity=average trade size/security price

The average trade quantity is stored if the optional average trade size has been set.

The user then sends the resulting trade file to TCA Engine 42 for processing. Once the results file is received from TCA Engine 42 or entered manually, it is loaded back into the BMA 34 at 596 (FIG. 10) and the total market impact for the fund is calculated as:

market impact=SUM(TCA total_costs/weight)

At this point, the UI will display a status of "Effects Applied" and this record will be used for all subsequent daily fee calculations until the next fee history record is created.

Daily BMA Fee Process

The daily fee calculation in the BMA occurs every time the rules engine 20/APLF construction engine 24 (FIG. 2) runs for a fund.

The rules engine 20/APLF construction engine 24 executes the SP_BMA_CALC_AP_FEES stored procedure. This procedure performs the following steps to derive the fees:

1. calculate current CU factor
2. calculate the current basket value as nav_per_share*cu_per_share
3. pull the APLF basket cash for the US DOLLARS position
4. calculate weighted average fee values from the most recent fee history record:

wgt avg fee=Market Impact+Commission+Settlement Cost+Mkt Impact Adj 5. calculated total fee:

total fee=wgt avg fee*APLF basket cash

Fee Extract Process

The Fee Extract Process is performed by Creation Fee module 33, and in particular embodiments involves extracting fee amounts and creating files to be sent to ETP Administrator 30 and the fund's web site at 512 and 510, respectively. The APLF extract process uses the daily fee record 600 and calculates the ETP Administrator Fee File 512 as shown in Table II, and the Fund Fee File 510 as shown in Table III.

TABLE II

| | |
|---|---|
| Cash | basket_value * (market impact + commission + settlement_cost) |
| Inkind | Multiply stored fee_total times 1 to 20 CUs |
| Fixed | fixed_fee value if defined |

TABLE III

| | |
|---|---|
| Cash | basket_value * (market impact + commission + settlement_cost + market impact adjustment) |
| Inkind | fee_total as stored |

In various embodiments, the following SQL Server tables (Tables IV-VII) in the database are used in the BMA Fee Calculation process:

TABLE IV

T_BMA_MASTER_FEE_TIERS

| | |
|---|---|
| Definition | Stores a fund's fee tier information and associated tier creation unit limits |
| Maintenance | Maintained on the Fund Maintenance UI off the main UI grid right click menu. |
| tier_seq | Incremental unique tier sequence starting at one. Currently two sequences are required by the fee process. |
| tier_cu | Associated low range creation unit for the tier sequence. For tier_seq 1, this value should be 1. |
| tier_late_fee | Optional late fee for the associated tier creation unit range. |

TABLE V

T_BMA_MASTER_FEE_HISTORY

| | |
|---|---|
| Definition | Stores a periodic fund's effects values to be used during the daily fee calculation process. |
| Maintenance | Maintained by a combination of automated processes and manually thru the Creation Fee Management UI. |
| aplf_verson_id | APLF version upon which the fee effects are based. |
| market_impact | Weighted total market impact as calculated from the security level fee effects. |
| commission | Manually entered commission amount. |
| late_penalty | Optional late penalty for the associated fee tier from the fee tier table. |
| settlement_cost | Optional/manually entered settlement cost adjustment. |
| market_impact_adj | Optional/manually entered market impact adjustment. |
| fixed_fee | Optional/manually entered fixed fee amount. |

TABLE VI

T_BMA_MASTER_FEE_EFFECTS

| | |
|---|---|
| Definition | Stores security level quantities and TCA calculated market impact costs used to aggregate to the fee history total market_impact value |

TABLE VI-continued

T_BMA_MASTER_FEE_EFFECTS

| | |
|---|---|
| Maintenance | Maintained by a combination of automated processes and manually thru the Creation Fee Management UI. |
| aplf_verson_id | APLF version upon which the fee effects are based. |
| market_impact | Weighted total market impact as calculated from the security level fee effects. |
| commission | Manually entered commission amount. |
| late_penalty | Optional late penalty for the associated fee tier from the fee tier table. |
| settlement_cost | Optional/manually entered settlement cost adjustment. |
| market_impact_adj | Optional/manually entered market impact adjustment. |
| fixed_fee | Optional/manually entered fixed fee amount. |

TABLE VII

T_BMA_MASTER_FUND_AP_FEES

| | |
|---|---|
| Definition | Stores daily calculated fee amounts. |
| Maintenance | Maintained automatically thru the rules processing and SP_BMA_CALC_AP_FEES stored procedure. |
| aplf_verson_id | APLF version upon which the fee effects are based. |
| fee_total | Daily fee calculated for tier 1 |
| fee_total_late | Daily late fee calculated for tier 1 |
| fee_total_2 | Daily fee calculated for tier 2 |
| fee_total_late_2 | Daily late fee calculated for tier 2 |

Accounting Data Loads (72)

Position level data loads 72 supplied by OMS 44 are stored in the Master Positions table 628. Each data set can potentially come in different formats, and needs to be transformed in order to be integrated with other data sets by Daily Load module 22. An exemplary workflow for each of these data sets is shown and described with respect to FIG. 13A. At 620, the raw data is captured from OMS 44 and/or from any number of additional sources, and stored in Store Table 622 in its native format. The raw data is also stored in a temporary stage table 624 where it is electronically time-stamped and will under technical validation. In particular embodiments, handling and technical validation of the raw data at stage table 624 includes sending the raw data to any number of processes (e.g., individual stage tables 624) based on its format. For example, data captured from a CRD Investment Management Solution (Charles River Development, Burlington, Mass.), will be sent to a process/table capable of handling the CRD data format. Examples of other processes used by table 624 include those configured to handle data from the Perform® MUNI fixed income portfolio analysis system (Investortools, Inc. Chicago, Ill.), Eagle PACE data management system (Eagle Investment Systems, Wellesley, Mass.), TABS, Fund Connect (sm) trading tool (State Street Corporation, Boston, Mass.), and/or Bloomberg AIM asset and investment manager (Bloomberg Finance, LP, New York, N.Y.). These processes extract reference data for each of the securities to which the data pertains. Notably, some of the files are security master files, while others are position level data from which reference data will need to be extracted.

Turning now to FIGS. 13B-13D, an example of this technical validation operation is now shown and described with respect to a stage table 624 configured for handling data in the CRD format. The BMA uses stage table 624 to handle transformations and technical validations/datatype checks in a single step. BMA 34 transforms raw data as necessary in order to scrub it for technical validation. Below is the breakdown of this single step.

As shown in the screen shot of FIG. 13B, a stage table 624 for the desired format (e.g., CRD in this example) includes a series of rows 640 with data names and criteria such as their datatypes and whether nulls are allowed, etc. As shown in FIG. 13C, BMA 34 then runs appropriate tests on each column based on the desired datatype definitions, to validate the data. Any data falling outside of its desired datatype definition is identified, e.g., with checkmarks 642, to undergo transformation. As shown in FIG. 13D, data identified as invalid undergoes a transformation process in which the system automatically identifies and separates data payload from extraneous (e.g., header) information, and/or adds padding, etc., to attempt to place it into a format usable by the system. One common transformation includes converting the Date format YYYYMMDD to a date format recognized by BMA 34. This step is accomplished by applying a transformation rule 644 to the Effective Date row during the data load process. Other transformations include, but are not limited to, removing header information such as data packet headers, e.g., after decrypting SFTP data packets received from ETP administrator 30, or from primary market system 38 in the case of a stage table 624 for creation order data received at 76 (FIG. 2). Other header information removed as part of the transformation process may include leading quotes/double quotes/commas, and/or other symbols/punctuation. Moreover, in particular embodiments transformations include padding columns with 1's or 0's, etc., to meet character requirements. The transformed data is then again run through the validation process of FIG. 13C to confirm that the transformed data is now in a form usable by the system. If the transformed data continues to fail validation, then the validation and transformation processes may be repeated, in which the data is subjected to escalating levels of transformation with each repetition to try to ultimately have the data validated. If repeated attempts fail to produce validated data, then these steps may begin again with the raw data retained in table 620. Alternatively, if the data isn't critical to the data load, the failed data may be nulled in order to process the rest of the data; or if the data is deemed important, the system may generate an error message and the entire data load will be listed as 'failed' until the error is addressed. One of the goals of this phase of the process, is to ensure that all securities are resolved to the correct internal identifier, avoiding duplication of security master records in the database.

The extracted reference data is then aggregated and fed to a data matcher process that normalizes the data so it can be moved to OMS Master table 626. At table 626, the data will undergo business validations, in which data that is extraneous to the basket creation process, e.g., which is extraneous to the position-level data load described below, is purged or otherwise removed from consideration. The remaining data is sent to Position Master table 628. Position Master table 628 is an aggregated table with position-level data loads for each position, which data has been trimmed down and validated/formatted for use in BMA 34.

It should be noted that although not necessarily required, in particular embodiments each position-level raw data file will follow this workflow. Position-level data loads supplied by table 626 to Position Master table 628 include:

Positions—Beginning of day, or end of day: Position files will contain the current holdings for any given fund.

CU (Creation Unit) Activity—This file will contain information to determine how much in kind trading activity there is, which will update the current days positions.

Transactions—Files that contain the trading activity for any given fund

Figure 14:
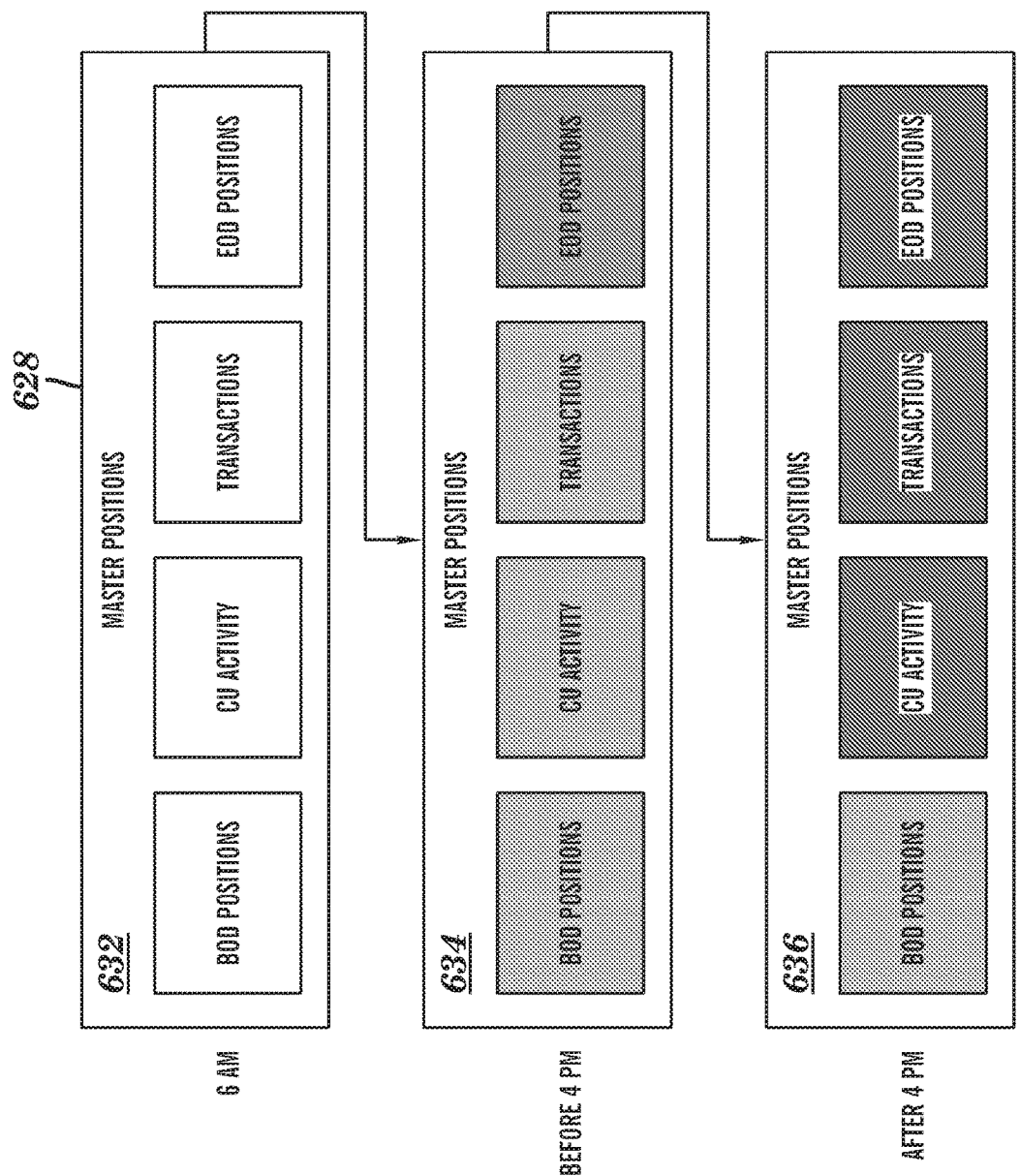
FIG. 14 is a graphical representation of a table used in embodiments of the present invention.

Referring now to FIG. 14-15, the Position Master table 628 will be described in greater detail. As shown, table 628 will hold all available position level data, but will only display, e.g., on UI 630, the most relevant/recent data, as determined by electronic time stamps applied automatically to the data upon receipt by BMA 34. It should be noted that table 628 and UI 630 update dynamically on a substantially real-time basis as data is obtained from the various sources described hereinabove. The view generated by UI 630 is determined based on a hierarchy of data. Because the highest priority of data isn't available until the end of the day, the end user view is supplemented with the lower priority sets in the meantime. As data is loaded throughout the day, the position table will continue to update. The calculated end value will be one of two formulas:

$$\text{BOD Positions} + \text{CU Activity} + \text{Transactions} \tag{1}$$

$$\text{EOD Positions} + \text{CU Activity} \tag{2}$$

In particular embodiments, the data is color-coded in UI 630 to enable users to quickly determine the hierarchical level of the displayed data. For example, data captured at 6 am is colored gray as shown at 632 to indicate that its hierarchical value is low. Subsequently captured data, e.g., captured after 6 am and before 4 pm, is color coded orange or red as shown at 634 and overwrites the gray data on UI 630 (FIG. 15). Data received later still, e.g., after 4 pm, is colored green as shown at 636. It should be noted that BOD (Beginning of Day) data is not updated after 4 pm, and therefore remains orange at 636. This green data overwrites the orange/red data in UI 630 as shown.

Figure 16:
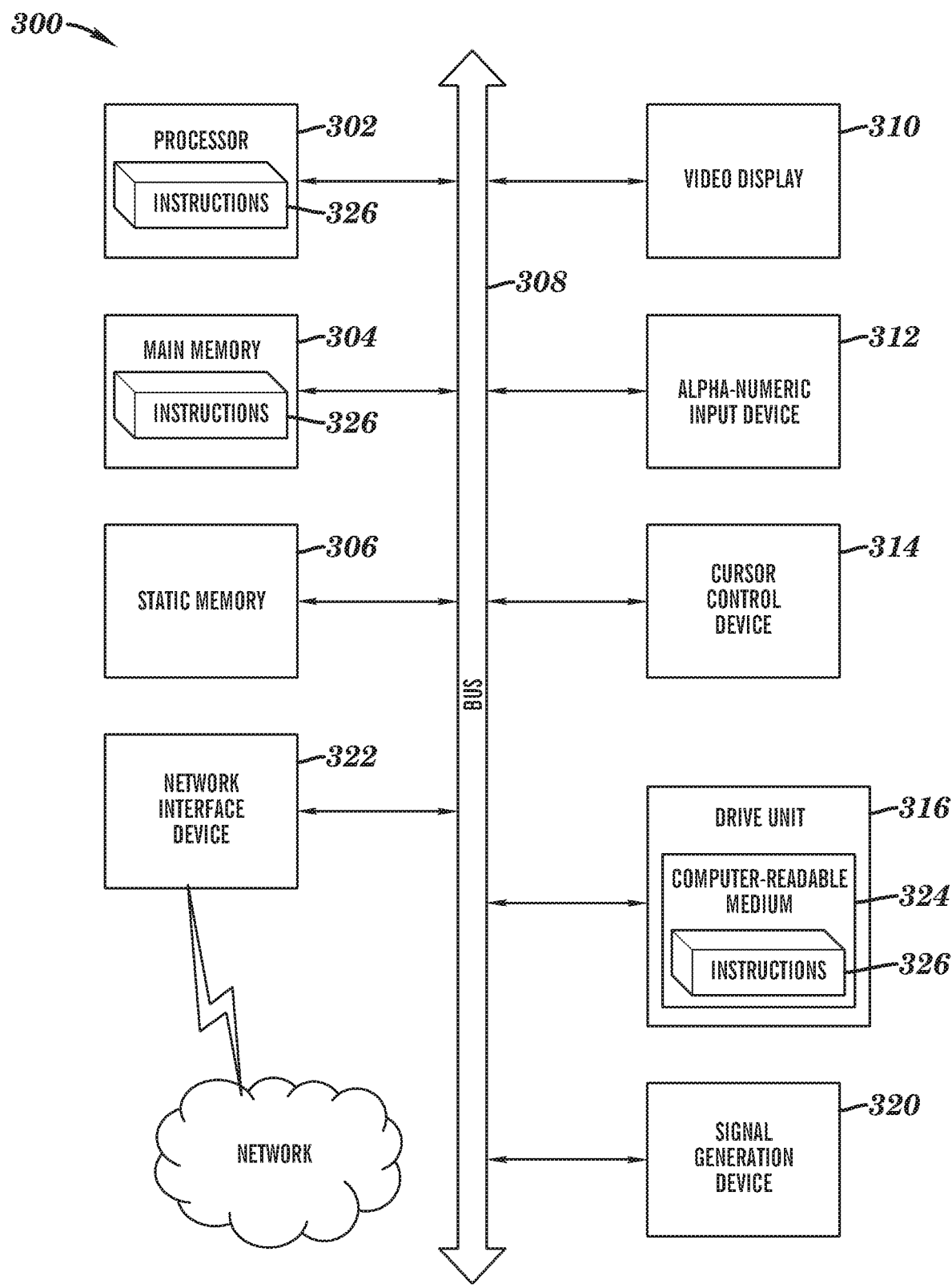
FIG. 16 is a block diagram of one embodiment of a computer system usable with aspects of the present invention.

FIG. 16 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real-time network operating systems.

The present invention also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

The required structure for the systems disclosed herein will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A method for modeling and generating basket data for non-transparent exchange-traded fund (ETF) portfolios for creation and redemption of ETF shares, including securely communicating ETF portfolio data with specialized market trading systems, and electronically validating and transforming the ETF portfolio data and basket data, the method comprising:
   (a) communicably coupling a basket modeling application computer (BMA) to:
      a specialized fund management computer (FMC) that receives start of day positions from a fund database and executes trades throughout a trading day (T) for the ETF; and
      a specialized primary market trading computer (PMTC) that interacts with Authorized Participants (APs) to use yesterday's (T–1) basket data to execute creation orders of the ETF throughout the trading day;
   (b) receiving, with the BMA during the trading day, portfolio data from the FMC;
   (c) storing and electronically time-stamping, with the BMA, the portfolio data in a raw data file;
   (d) capturing, with the BMA during the trading day, encrypted T–1 basket data and creation order data from the PMTC, the T–1 basket data and creation order data including creation orders executed by the PMTC during the trading day;
   (e) decrypting, with the BMA, the encrypted T–1 basket data and creation order data, and storing and electronically time-stamping the decrypted T–1 basket data and creation order data in the raw data file;
   (f) technically validating and transforming, with the BMA, the raw data file, said technically validating and transforming including separating header information from payload information in data packets stored in the raw data file, and storing the payload information to form a composite image of the ETF portfolio;
   (g) applying, with the BMA, a set of rules to the composite image of the ETF portfolio to generate today's basket data (T basket);
   (h) repeating said (b)-(g) continuously throughout the trading day both before and after the close of trading for the day; and
   (i) disseminating, with the BMA, the T basket.

2. The method of claim 1, further comprising:
communicably coupling the basket modeling application computer (BMA) to:
   a specialized basket dissemination computer (BDC); and
   a specialized market impact analysis computer (MAC);
transmitting, with the FMC during the trading day, the portfolio data to the BMA, the portfolio data including portfolio information for the ETF including start of day positions and trading information for trades executed by the FMC during the trading day, the portfolio data being disposed in a native FMC format; and
wherein said disseminating (i) comprises transmitting, with the BMA, the T basket to the BDC.

3. The method of claim 1, wherein:
said storing (c) further comprises storing and electronically time-stamping, with the BMA, the portfolio data in the native FMC format in the raw data file;
said capturing (d) further comprises capturing, with the BMA during the trading day, encrypted T–1 basket data and creation order data from the PMTC, the T–1 basket data and creation order data including additional portfolio information for the ETF including creation orders executed by the PMTC during the trading day, the encrypted T–1 basket data and creation order data being disposed in a native PMTC format;
said decrypting (e) further comprises decrypting, with the BMA, the encrypted T–1 basket data and creation order data, and storing and electronically time-stamping the decrypted T–1 basket data and creation order data in the native PMTC format in the raw data file; and
said technically validating (f) further comprises technically validating and transforming, with the BMA, the raw data file, said technically validating and transforming including separating header information from payload information in data packets stored in the raw data file, and storing the payload information in a stage table to form a composite image of the ETF portfolio.

4. The method of claim 1, further comprising communicably coupling the BMA to a specialized exchange-traded product administrator (ETP) computer.

5. The method of claim 1, wherein said applying (g) further comprises applying top down rules and bottom up rules.

6. The method of claim 5, wherein the bottom up rules are directed towards individual securities and the top down rules are securities agnostic.

7. The method of claim 1, further comprising loading the payload information throughout the trading day from the stage table to a tiered master positions table communicably coupled to a color-coded graphical user interface (GUI), the payload information including beginning of day (BOD) positions, creation unit (CU) activity, transactions, and end of day (EOD) positions, the payload information being prioritized and loaded into tiers of the master positions table and color-coded based on said time-stamping.

8. The method of claim 7, further comprising using formula (1)
(1) BOD Positions +CU Activity +Transactions for calculating first position information using payload information in the master positions table time-stamped before the close of trading for the day, and populating the GUI with the first position information in a first color-code.

9. The method of claim 8, further comprising using formula (2)
(2) EOD Positions +CU Activity for calculating second position information using payload information in the master positions table time-stamped at or after the close of trading for the day, and populating the GUI with the second position information by overwriting the first position information in a second color-code.

10. The method of claim 9, further comprising iterating said calculating throughout the trading day with subsequent iterations overwriting previous iterations in the GUI.

11. The method of claim 2, further comprising generating, with the BMA using the set of rules, a variance between the composite image of the ETF portfolio and the T basket, the variance including a selection of one or more securities, wherein composition of the composite image of the ETF portfolio differs from composition of the T basket, said variance serving to conceal at least a portion of the composition of the ETF portfolio upon publication of the T basket.

12. The method of claim 11, wherein said receiving further comprises receiving portfolio data from the FMC, in which the FMC takes the form of an order management system (OMS) selected from the group consisting of a trading system for equities, a trading system for fixed income, and combinations thereof.

13. The method of claim 12, further comprising, with the BMA, calculating a variable fee for conforming the T basket to the composite image of the ETF portfolio, wherein the fee calculation includes calculating trades required to conform the T basket to the composite image of the ETF portfolio and calculating commissions due for the trades.

14. The method of claim 13, further comprising encrypting and transmitting, with the BMA, the trades required to conform the T basket to the composite image of the ETF to the MAC, and receiving from the MAC an encrypted rate applicable to a dollar equivalent of estimated market movement generated by the trades, decrypting and multiplying the rate by the dollar equivalent to generate a market movement fee, and adding the market movement fee to the commissions due for the trades, to generate a composite fee.

15. An apparatus having a plurality of specialized computers operating as part of a specialized trading network, wherein the computers collectively model and generate basket data for non-transparent exchange-traded fund (ETF) portfolios for creation and redemption of ETF shares, including securely communicating ETF portfolio data with specialized market trading systems, and electronically validating and transforming the ETF portfolio data and basket data, system comprising:
a basket modeling application computer (BMA);
the BMA communicably coupled to:
  a specialized primary market trading computer (PMTC) that interacts with Authorized Participants (APs) to use yesterday's (T−1) basket data to execute creation orders of the ETF throughout the trading day;
  a specialized fund management computer (FMC) that receives start of day positions from a fund database and executes trades throughout a trading day (T) for the ETF, the FMC having a memory, a processor, and a stored program in the memory executable by the processor, the stored program configured to cause the FMC to transmit, during the trading day, portfolio data to the BMA, the portfolio data including portfolio information for the ETF including start of day positions and trading information for trades executed by the FMC during the trading day, the portfolio data being disposed in a native FMC format;
the BMA having an other memory, an other processor, and an other stored program in the other memory executable by the other processor, the other stored program configured to:
  (a) cause the BMA to receive, during the trading day, the portfolio data from the FMC;
  (b) cause the BMA to store and electronically time-stamp the portfolio data in a raw data file;
  (c) cause the BMA to capture, during the trading day, encrypted T−1 basket data and creation order data from the PMTC, the T−1 basket data and creation order data including creation orders executed by the PMTC during the trading day;
  (d) cause the BMA to decrypt the encrypted T−1 basket data and creation order data, and storing and electronically time-stamping the decrypted T−1 basket data and creation order data in the raw data file;
  (e) cause the BMA to technically validate and transform the raw data file, said technically validating and transforming including separating header information from payload information in data packets stored in the raw data file, and storing the payload information to form a composite image of the ETF portfolio;
  (f) cause the BMA to apply a set of rules to the composite image of the ETF portfolio to generate today's basket data (T basket);
  (g) cause the BMA to repeat said (a)-(g) continuously throughout the trading day both before and after close of trading for the day; and
  (h) cause the BMA to transmit the T basket to the BDC.

16. The apparatus of claim 15, further comprising the FMC, and the BMA being communicably coupled to:
a specialized basket dissemination computer (BDC); and
a specialized market impact analysis computer (MAC).

17. The apparatus of claim 15, wherein:
said (b) further comprises the other stored program configured to cause the BMA to store and electronically time-stamp the portfolio data in the native FMC format in a raw data file;
said (c) further comprises the other stored program configured to cause the BMA to capture, during the trading day, encrypted T−1 basket data and creation order data from the PMTC, the T−1 basket data and creation order data including creation orders executed by the PMTC during the trading day, the encrypted T−1 basket data and creation order data being disposed in a native PMTC format;
said (d) further comprises the other stored program configured to cause the BMA to decrypt the encrypted T−1 basket data and creation order data, and storing and electronically time-stamping the decrypted T−1 basket data and creation order data in the native PMTC format in the raw data file;
said (e) further comprises the other stored program configured to cause the BMA to technically validate and transform the raw data file, said technically validating and transforming including separating header information from payload information in data packets stored in the raw data file, and storing the payload information in a stage table to form a composite image of the ETF portfolio.

18. The apparatus of claim 15, wherein the BMA is communicably coupled to a specialized exchange-traded product administrator (ETP) computer.

19. The apparatus of claim 15, wherein said (f) further comprises causing the BMA to apply top down rules and bottom up rules.

20. The method of claim 19, wherein the bottom up rules are directed towards individual securities and the top down rules are securities agnostic.

21. The apparatus of claim 15, wherein the other stored program is further configured to cause the BMA to load the payload information from the stage table to a tiered master positions table communicably coupled to a color-coded graphical user interface (GUI), the payload information including beginning of day (BOD) positions, creation unit (CU) activity, transactions, and end of day (EOD) positions, the payload information being prioritized and loaded into tiers of the master positions table and color-coded based on said time-stamping.

22. The apparatus of claim 15, wherein the other stored program is further configured for using formula (1)
 (1) BOD Positions + CU Activity + Transactions for calculating first position information using payload information in the master positions table time-stamped before the close of trading for the day, and populating the GUI with the first position information in a first color-code.

23. The apparatus of claim 22, wherein the other stored program is further configured for using formula (2)
 (2) EOD Positions +CU Activity for calculating second position information using payload information in the master positions table time-stamped at or after the close of trading for the day, and populating the GUI with the second position information by overwriting the first position information in a second color-code.

24. The apparatus of claim 23, wherein the other stored program is further configured for iterating said calculating (k) throughout the trading day with subsequent iterations overwriting previous iterations in the GUI.

25. The apparatus of claim 16, wherein the other stored program is further configured to cause the BMA to generate, using the set of rules, a variance between the composite image of the ETF portfolio and the T basket, the variance including a selection of one or more securities, wherein composition of the composite image of the ETF portfolio differs from composition of the T basket, said variance serving to conceal at least a portion of the composition of the ETF portfolio upon publication of the T basket.

26. The apparatus of claim 25, wherein the FMC comprises an order management system (OMS) selected from the group consisting of a trading system for equities, a trading system for fixed income, and combinations thereof.

27. The apparatus of claim 26, wherein the other stored program is further configured to cause the BMA to calculate a variable fee for conforming the T basket to the composite image of the ETF portfolio, wherein the fee calculation includes calculating trades required to conform the T basket to the composite image of the ETF portfolio and calculating commissions due for the trades.

28. The apparatus of claim 27, wherein the other stored program is further configured to cause the BMA to encrypt and transmit the trades required to conform the T basket to the composite image of the ETF to the MAC, and receiving from the MAC an encrypted rate applicable to a dollar equivalent of estimated market movement generated by the trades, decrypting and multiplying the rate by the dollar equivalent to generate a market movement fee, and adding the market movement fee to the commissions due for the trades, to generate a composite fee.

\* \* \* \* \*